(12) United States Patent
Asayama et al.

(10) Patent No.: US 8,094,830 B2
(45) Date of Patent: Jan. 10, 2012

(54) VIDEO/SOUND OUTPUT DEVICE AND EXTERNAL SPEAKER CONTROL DEVICE

(75) Inventors: Sako Asayama, Nara (JP); Hiroshi Kase, Osaka (JP); Mitsuteru Kataoka, Osaka (JP); Akihiro Mitani, Osaka (JP); Toshiki Murakami, Osaka (JP); Masahiko Mizoguchi, Osaka (JP); Masazumi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 1133 days.

(21) Appl. No.: 11/910,584

(22) PCT Filed: Sep. 25, 2006

(86) PCT No.: PCT/JP2006/318985
§ 371 (c)(1),
(2), (4) Date: Oct. 3, 2007

(87) PCT Pub. No.: WO2007/037208
PCT Pub. Date: Apr. 5, 2007

(65) Prior Publication Data
US 2009/0262256 A1 Oct. 22, 2009

(30) Foreign Application Priority Data

Sep. 29, 2005 (JP) .................................. 2005-284620
Sep. 30, 2005 (JP) .................................. 2005-289095
Oct. 14, 2005 (JP) .................................. 2005-301014

(51) Int. Cl.
*H04B 3/00* (2006.01)
(52) U.S. Cl. ................. 381/77; 381/56; 381/58; 381/79; 381/80; 381/81; 381/123

(58) Field of Classification Search .................... 381/56, 381/58, 77, 79–81, 123
See application file for complete search history.

(56) References Cited

U.S. PATENT DOCUMENTS
6,034,737 A 3/2000 Koyama et al.
(Continued)

FOREIGN PATENT DOCUMENTS
EP 1 324 604 7/2003
(Continued)

OTHER PUBLICATIONS
International Search Report issued Nov. 14, 2006 in the International (PCT) Application of which the present application is the U.S. National Stage.
(Continued)

*Primary Examiner* — Andy Huynh
(74) *Attorney, Agent, or Firm* — Wenderoth Lind & Ponack, L.L.P.

(57) ABSTRACT

A television set includes: an internal speaker which outputs sound; a memory which holds information; a remote controller receiver which receives an instruction from the outside of the television set; a microcomputer which causes, based on a mode specifying instruction for specifying a sound output mode received by the remote controller receiver, the memory to hold any one of (a) information that indicates a first sound output mode in which sound is outputted from the internal speaker and (b) information that indicates a second sound output mode in which sound is outputted from an external speaker that is a speaker outside the television set; and an HDMI/CEC communication unit which outputs the information that indicates the sound output mode and that is held by the memory, to an amplifier which controls to operate or not operate the speaker outside the television set.

8 Claims, 20 Drawing Sheets

U.S. PATENT DOCUMENTS

| | | |
|---|---|---|
| 7,212,253 B1 | 5/2007 | de Groot et al. |
| 7,970,155 B2 * | 6/2011 | Asayama et al. ............. 381/123 |
| 2003/0185400 A1 | 10/2003 | Yoshizawa et al. |
| 2004/0073321 A1 | 4/2004 | Kondo |
| 2004/0181301 A1 | 9/2004 | Kimura et al. |
| 2005/0141857 A1 | 6/2005 | Shimozawa et al. |
| 2005/0192687 A1 | 9/2005 | Lee et al. |
| 2007/0127734 A1 | 6/2007 | Brulle-Drews |
| 2008/0316367 A1 | 12/2008 | Vasella |

FOREIGN PATENT DOCUMENTS

| | | |
|---|---|---|
| EP | 1 494 364 | 1/2005 |
| EP | 1 569 088 | 8/2005 |
| JP | 63-102571 | 5/1988 |
| JP | 5-153520 | 6/1993 |
| JP | 5-161091 | 6/1993 |
| JP | 10-079896 | 3/1998 |
| JP | 11-275684 | 10/1999 |
| JP | 2003-179821 | 6/2003 |
| JP | 2003-298975 | 10/2003 |
| JP | 2004-007389 | 1/2004 |
| JP | 2004-282138 | 10/2004 |
| WO | 00/72589 | 11/2000 |
| WO | 2004/001552 | 12/2003 |
| WO | 2005/071953 | 8/2005 |
| WO | 2006/057324 | 6/2006 |

OTHER PUBLICATIONS

Supplementary Partial European Search Report issued Nov. 9, 2010 in corresponding European Application No. 06 79 8310.

Partial English translation of JP 2003-298975 (published Oct. 17, 2003).

* cited by examiner

VIDEO/SOUND OUTPUT DEVICE AND EXTERNAL SPEAKER CONTROL DEVICE

BACKGROUND

The invention relates to a video/sound output device for outputting video and sound and an external speaker control device for controlling a speaker outside the video/sound output device.

A destination for outputting sound is sometimes to be switched from a speaker (internal speaker) built in a television set to an external speaker connected to an amplifier connected to the television set. In such cases, a user needs to perform: the operation of muting the sound outputted from the internal speaker of the television set, and also the operation of setting sound inputted into the amplifier to be the sound outputted from the television set.

Likewise, when contents recorded in a player or recorder connected to the amplifier are to be reproduced, in some cases, the sound of the contents are to be outputted from the external speaker. In such cases, the user needs to perform the operation of muting the sound outputted from the internal speaker of the player or recorder, and the operation of setting the sound inputted into the amplifier to be the sound outputted from the television set.

When these operations are to be performed, the user needs to determine by oneself whether the sound inputted into the amplifier should be set to the sound outputted from the television set or to the sound outputted from the player or recorder, and then needs to perform the operation for the television set using a remote controller and the operation for the amplifier using a remote controller. These operations are complicated for the user.

Japanese Laid-Open Patent Publication No. H5-153520 discloses a technique by which a power switch of the amplifier is linked with a sound output mode of the television set. That is, it is disclosed that, when the amplifier is turned ON, the sound output of the television set is inputted through the amplifier to the external speaker, whereas when the amplifier is turned OFF, the sound output of the television set is inputted to the internal speaker built in the television set. Thereby, when the user merely operates a power button of the remote controller of the amplifier, the destination for outputting sound can be switched between the internal speaker and the external speaker.

As described above, according to the technique disclosed in Japanese Laid-Open Patent Publication No. H5-153520, when the remote controller of the amplifier is operated, the destination for outputting the sound can be switched between the internal speaker and the external speaker. However, in order to adjust a volume of the sound outputted from the internal speaker of the television set, the user need operate a sound volume adjustment button of the remote controller of the television set, while in order to adjust a volume of the sound outputted from the external speaker, the user need operate a sound volume adjustment button of the remote controller of the amplifier. That is, according to the technique disclosed Japanese Laid-Open Patent Publication No. H5-153520, although the destination for outputting sound can be switched between the internal speaker and the external speaker by operating the remote controller of the amplifier, the remote controller of the television set should be used to adjust the volume of the output sound from the internal speaker. Users desire to switch the destination for outputting sound between the internal speaker and the external speaker by operating only the remote controller of the television set which is operated most frequently. That is, users desire to switch the sound output mode merely by operating the remote controller of the television set.

SUMMARY

An aspect of the invention provides a video/sound output device which receives an instruction of sound output mode from a user and an external speaker control device which controls the sound outputted from the external speaker based on the instruction.

In order to solve the above-mentioned problem, the video/sound output device according to an aspect of the invention outputs video and sound and includes: an internal speaker which outputs sound; a holding unit which holds information; a receiving unit which receives an instruction from outside of the video/sound output device; a management unit which causes, based on a mode specifying instruction for specifying a sound output mode received by the receiving unit, the holding unit to hold one of (a) information indicating a first sound output mode in which sound is outputted from the internal speaker, and (b) information indicating a second sound output mode in which sound is outputted from an external speaker that is a speaker outside the video/sound output device; and an output unit which outputs the information indicating the sound output mode held in the holding unit, to an external speaker control device which controls to operate or not to operate the external speaker. Thereby, merely by providing to the video/sound output device the instruction for specifying the sound output mode, the user can control the output mode of the sound.

Here, the external speaker control device may (a) not cause the sound to be outputted from the external speaker, when the information indicating the first sound output mode is received, and (b) cause the sound to be outputted from the external speaker, when the information indicating the second sound output mode is received. Thereby, merely by providing to the video/sound output device the instruction for specifying the sound output mode, the user can control to or not to output the sound from the external speaker.

Further, the output unit may output information indicating a changed sound output mode to the external speaker control device, when the information indicating the sound output mode held in the holding unit is changed. Thereby, in a case that the information that indicates the sound output mode is, for example, mode information, by merely outputting the changed mode information to the external speaker control device, the user can control the output mode of the sound.

Further, the video/sound output device may further include a control unit (a) cause the sound to be outputted from the internal speaker, when the information indicating the first sound output mode is held in the holding unit, and (b) not cause the sound to be outputted from the internal speaker, when the information indicating the second sound output mode is held in the holding unit. Thereby, merely by providing to the video/sound output device the instruction for specifying the sound output mode, the user can control to or not to output the sound from the internal speaker.

Here, the control unit (a) controls a volume of the sound outputted from the internal speaker based on a sound volume change instruction for changing the volume of the output sound, if the receiving unit receives the sound volume change instruction from the outside of the video/sound output device, when the information indicating the first sound output mode is held in the holding unit, and the output unit may (b) output sound volume control information for controlling a volume of the sound outputted from the external speaker based on the sound volume change instruction, if the receiving unit receives the sound volume change instruction from the outside of the video/sound output device, when the information indicating the second sound output mode is held in the holding unit. Thereby, merely by providing to the video/sound output device the instruction for specifying the sound output mode, the user can control the volume of the sound outputted from the internal speaker and control the volume of the sound outputted from the external speaker.

Further, the output unit may (a) output power supply control information for turning OFF the external speaker control device to the external speaker control device, when the information indicating the first sound output mode is held in the holding unit, and (b) output a power supply control information for turning ON the external speaker control device to the external speaker control device, when the information indicating the second sound output mode is held in the holding unit. Further, when the external speaker control device is not to be used, the external speaker control device can be turned ON.

Further, the receiving unit may receive the mode specifying instruction from a remote controller which controls a main body of the external speaker control device. Thereby, even if the remote controller for controlling a main body of the external speaker control device is used, a user can easily control the sound output mode by operating the remote controller.

Further, an external speaker control device according to an aspect of the invention controls an external speaker that is a speaker outside a video/sound output device. The external speaker control device includes: a receiving unit which receives information indicating a sound output mode from the video/sound output device; and a sound control unit which (a) does not cause the sound to be outputted from the external speaker, when the receiving unit receives information indicating a first sound output mode in which the sound is outputted from a speaker inside the video/sound output device, and (b) causes the sound to be outputted from the external speaker, when the receiving unit receives information indicating a second sound output mode in which the sound is outputted from the external speaker. Thereby, merely by providing to the video/sound output device the instruction for specifying the sound output mode, the user can control the output mode of the sound.

Here, the sound control unit may control a volume of the sound outputted from the external speaker, based on sound volume control information for controlling the volume of the sound outputted from the external speaker, if the sound volume control information is received from the video/sound output device, when the receiving unit receives the information indicating the second sound output mode. Thereby, merely by providing to the video/sound output device the instruction for specifying the sound output mode, the user can control the volume of the sound outputted from the external speaker.

Further, the external speaker control device may further include a power control unit which (a) turns OFF the external speaker control device, when the receiving unit receives the information indicating the first sound output mode, and (b) turns ON the external speaker control device, when the receiving unit receives the information indicating the second sound output mode. Thereby, when the external speaker control device is not to be used, the external speaker control device can be turned OFF. Further, when the external speaker control device is not to be used, the external speaker control device can be turned ON.

Further, the external speaker control device may further include an external device control unit which controls an operation of a predetermined device outside the external speaker control device based on the information indicating the sound output mode received by the receiving unit, the predetermined device not being the video/sound output device nor the external speaker. Thereby, without replacing the video/sound output control device or updating the software of the video/sound output control device, the operation of the predetermined device can be controlled based on the information indicating the sound output mode.

Further, the external device control unit may (a) cause a lighting device, which is the predetermined device, to light up, when the information indicating the first sound output mode is received, and (b) cause the lighting device, which is the predetermined device, to light down, when the information indicating the second sound output mode is received. Thereby, without replacing the video/sound output control device or updating the software of the video/sound output control device, the operation of the lighting device can be controlled based on the information indicating the sound output mode.

Further, the external speaker control device may further include an output unit which outputs a mode specifying instruction for specifying the sound output mode, to the video/sound output device. Thereby, even during the use of the external speaker control device, the user can easily control the sound output mode by operating the external speaker control device.

Further, the output unit may output the mode specifying instruction to the video/sound output device, when a predetermined button on a remote controller which controls a main body of the external speaker control device is pressed. Thereby, even when the remote controller for controlling a main body of the external speaker control device is used, the user can easily control the sound output mode by operating the remote controller.

Further, a sound signal output device according to an aspect of the invention outputs sound signals of a plurality of channel modes. The sound signal output device includes: a receiving unit which receives information indicating a sound output mode from a video/sound output device; and an output unit which (a) outputs a sound signal whose number is a first channel number that is a predetermined number of channels, when the receiving unit receives information indicating a first sound output mode in which sound is outputted from a speaker inside the video/sound output device, and (b) outputs a sound signal whose number is a second channel number that is larger than the first channel number, when the receiving unit receives information indicating a second sound output mode in which sound is outputted from an external speaker. Thereby, merely by providing to the video/sound output device the instruction for specifying the sound output mode, the user can control the output mode of the sound.

Further, a video/sound output device according to an aspect of the invention outputs video and sound. The video/sound output device includes: a holding unit which holds information; a receiving unit which receives an instruction from outside of the video/sound output device; a management unit which causes, based on a mode specifying instruction for specifying a sound output mode received by the receiving unit, the holding unit to hold one of (a) information indicating a first sound output mode in which sound is outputted from a first external speaker that is a first speaker outside the video/sound output device, and (b) information indicating a second sound output mode in which sound is outputted from a second external speaker that is a second speaker outside the video/sound output device; and an output unit which outputs the information indicating the sound output mode held in the holding unit, to another video/sound output device having the first external speaker and to an external speaker control device which controls the second external speaker. Thereby, merely by providing to the video/sound output device the instruction for specifying the sound output mode, the user can control the output mode of the sound.

Here, the another video/sound output device may (a) cause the sound to be outputted from the first external speaker, when the information indicating the first sound output mode is received, and (b) not cause the sound to be outputted from the first external speaker, when the information indicating the second sound output mode is received. Thereby, merely by providing to the video/sound output device the instruction for specifying the sound output mode, the user can control to or not to output the sound from the first external speaker.

Further, the external speaker control device may (a) not cause the sound to be outputted from the second external speaker, when the information indicating the first sound output mode is received, and (b) cause the sound to be outputted from the second external speaker, when the information indicating the second sound output mode is received. Thereby, merely by providing to the video/sound output device the instruction for specifying the sound output mode, the user can control to or not to output the sound from the second external speaker.

Further, the output unit may outputs information indicating a changed sound output mode, to the another video/sound output device and the external speaker control device, when the information indicating the sound output mode held in the holding unit is changed. Thereby, in a case that the information that indicates the sound output mode is, for example, mode information, by merely outputting the changed mode information to the another video/sound output device and the external speaker control device, the user can control the output mode of the sound.

An aspect of the invention may also be implemented as a method having steps performed by the characteristic units in the video/sound output device according to an aspect of the invention; a program causing a computer to execute the steps; and an integrated circuit having the characteristic units. Further, an aspect of the invention may also be implemented as: a method having steps performed by the characteristic units in the external speaker control device according to an aspect of the invention; a program causing a computer to execute the steps; and an integrated circuit having the characteristic units. Further, an aspect of the invention may also be implemented as: a method having steps performed by the characteristic units in the sound signal output device according to an aspect of the invention; a program causing a computer to execute the steps; and an integrated circuit having the characteristic units. The above-mentioned programs may be distributed via a recording medium such as a CD-ROM, or a transmission medium such as a communication network.

An aspect of the invention provides: a video/sound output device which receives an instruction of sound output mode from a user; and an external speaker control device which controls the sound output from an external speaker based on the instruction.

As such, according to an aspect of the invention, merely using a remote controller of the video/sound output device (for example, a "television set"), an output of sound can be switched between a speaker inside the video/sound output device and a speaker outside the video/sound output device. Further, according to an aspect of the invention, the sound volume of the speaker inside the video/sound output device and the sound volume of the speaker outside the video/sound output device can be adjusted by the same operation. Further, according to an aspect of the invention, sound can be outputted appropriately even in the first sound output mode (for example, a "television mode") or even in the second sound output mode (for example, a "theater mode"). Further, even when the function of the external speaker control device such as an amplifier is extended in the future, the user can use the extended function without changing the function of the video/sound output device (for example, the "television set").

As such, according to an aspect of the invention, from the perspective of a user, the bothering complicated operations of changing remote controllers or the like become unnecessary. Further, an appropriate viewing and listening environment is automatically provided without the detailed knowledge of the devices. As such, a system employing an aspect of the invention realizes the switching of a sound output mode (mode of operation) by easy operation, and avoids the necessity of bothering complicated input switching operation. This remarkably improves the operation easiness, and hence is remarkably useful for the user.

Figure 1:
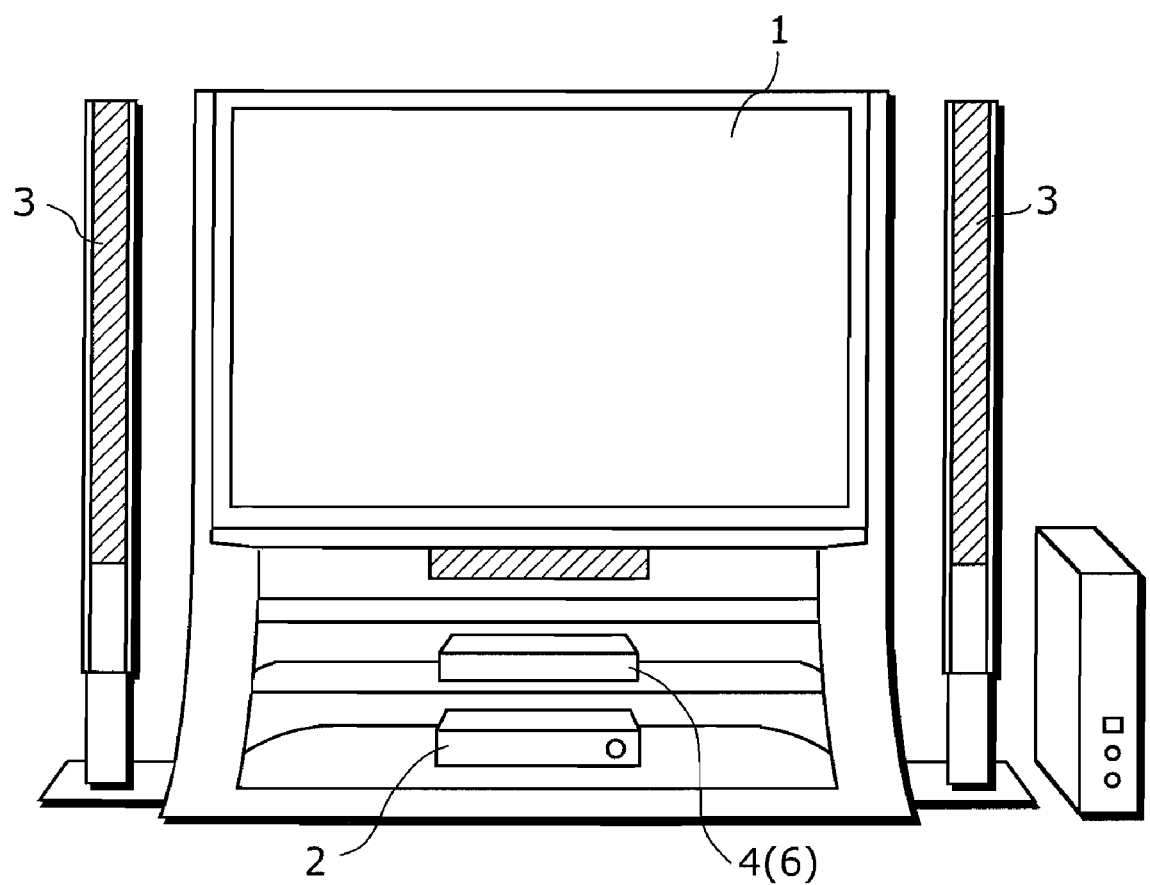
FIG. 1 is an external view of a system according to the first embodiment.

NUMERICAL REFERENCES 1 television set
2 amplifier 3 external speaker
4 player
5 external device
6 set-top box
7 television set
101 memory
102 remote controller receiver
103 microcomputer
104 HDMI/CEC communication unit
105 tuner
106 decoder
107 display
108 internal speaker
109 external output unit
110 mode flag
201 HDMI/CEC communication unit
202 microcomputer
203 HDMI/CEC communication unit
204 selector
205 external signal input unit
206 speaker output unit
301 power button of amplifier remote controller
302 CD switch button of amplifier remote controller
303 DVD switch button of amplifier remote controller
304 video switch button of amplifier remote controller
305 sound volume button of amplifier remote controller
306 mute button of amplifier remote controller
307 level button of amplifier remote controller
308 effect button of amplifier remote controller
310 mode switch button of amplifier remote controller
601 memory
602 remote controller receiver
603 microcomputer
604 HDMI/CEC communication unit
605 tuner
606 decoder
609 external output unit
610 mode flag
611 menu screen information
701 memory
702 remote controller receiver
703 microcomputer
721 HDMI/CEC communication unit
722 HDMI/CEC communication unit
705 tuner
706 decoder
707 display
708 internal speaker
709 external output unit
710 mode flag
711 menu screen information

DETAILED DESCRIPTION

The following describes embodiments according to the embodiments of the invention with reference to the drawings.

Embodiment 1

Figure 2:
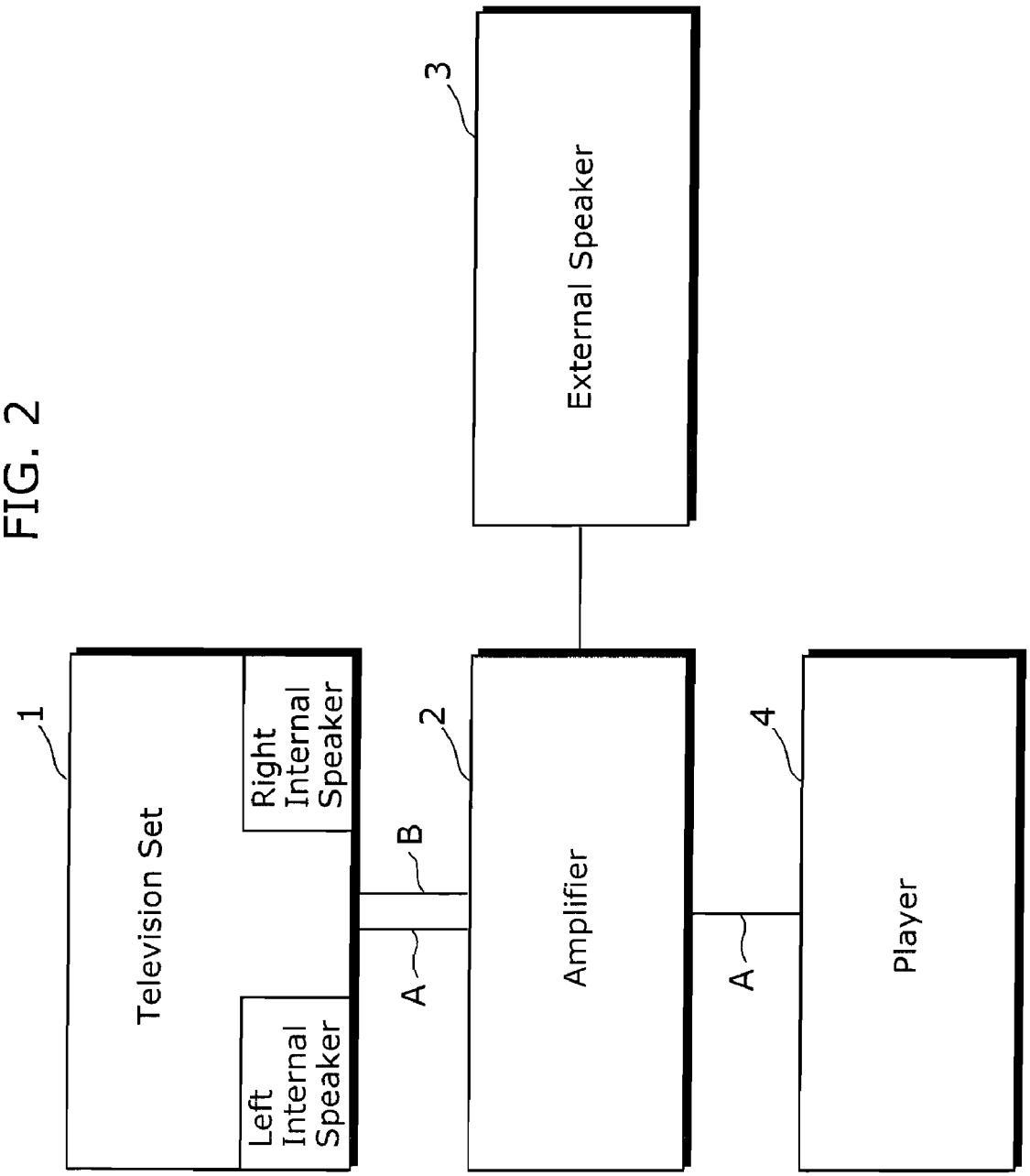
FIG. 2 is a diagram showing a configuration of a system according to the first embodiment.

FIG. 1 is an external view of a system according to the first embodiment. FIG. 2 is a diagram showing a configuration of a system according to the first embodiment. As shown in these figures, the system according to the first embodiment includes a television set 1, an amplifier 2, an external speaker 3 and a player 4. The television set 1 is an example of the video/sound output device according to the first embodiment of the invention. The amplifier 2 is an example of the external speaker control device according to the first embodiment of the invention. The player 4 is an example of the sound signal output device according to the first embodiment of the invention.

The amplifier 2 and the player 4 are interconnected through a High Definition Multimedia Interface (HDMI) cable A, so that a video signal and a sound signal reproduced by the player 4 are inputted to the amplifier 2. The television set 1 and the amplifier 2 are also interconnected through an HDMI cable A, so that a video signal and a sound signal outputted from the amplifier 2 are inputted to the television set 1. The television set 1 and the amplifier 2 are interconnected also through an optical cable B so that a sound signal outputted from the television set 1 is inputted to the amplifier 2.

The television set 1, the amplifier 2 and the player 4 can communicate CEC commands to each other via a Consumer Electronics Control (CEC) of the HDMI cables.

Figure 3:
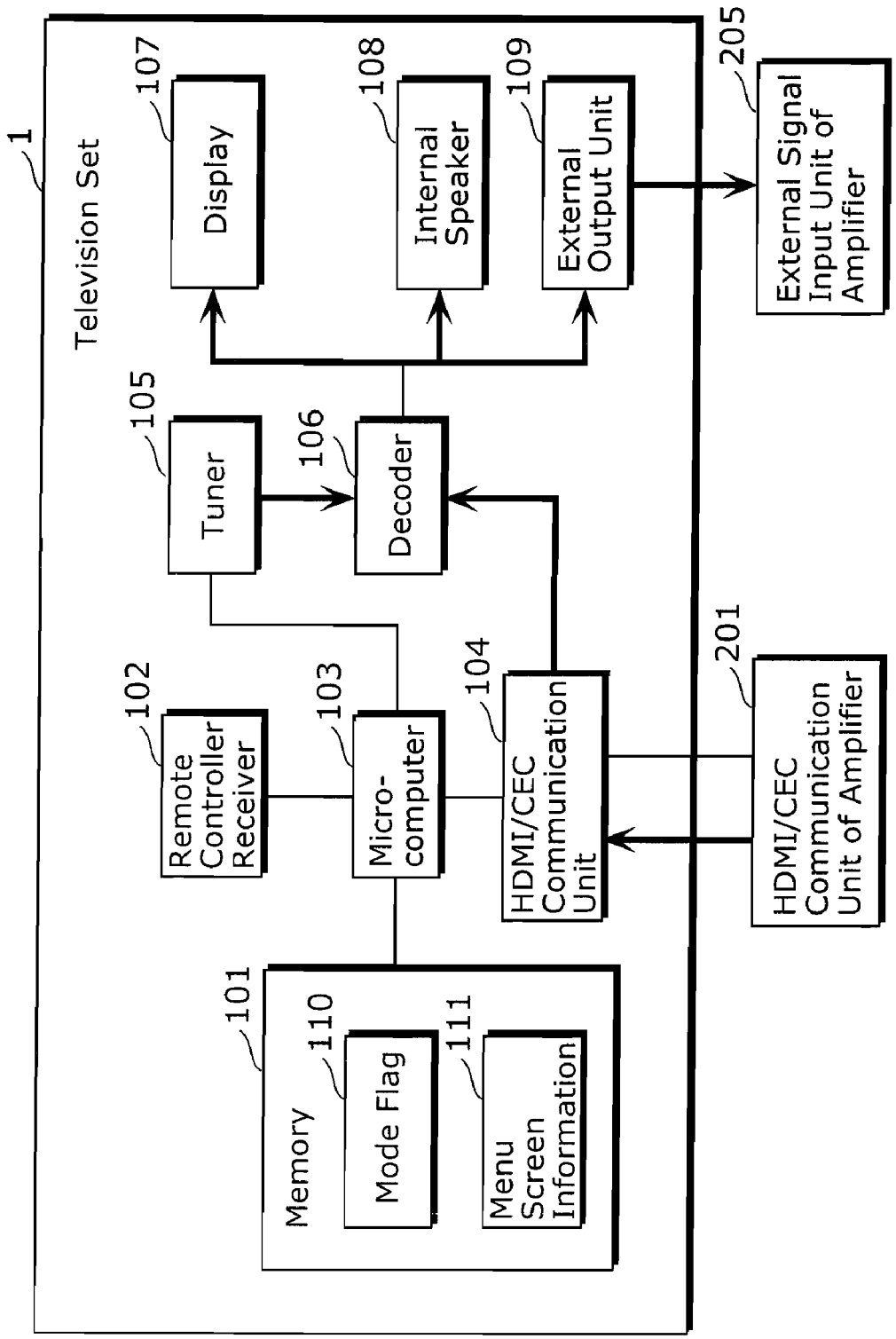
FIG. 3 is a block diagram showing a configuration of a television set according to the first embodiment.

FIG. 3 is a block diagram showing a configuration of the television set 1. The television set 1 includes a memory 101, a remote controller receiver 102, a microcomputer 103, an HDMI/CEC communication unit 104, a tuner 105, a decoder 106, a display 107, an internal speaker 108 and an external output unit 109. The memory 101 stores a mode flag 110 and menu screen information 111.

When the remote controller receiver 102 receives a command from a remote controller (described later) of the television set 1, the microcomputer 103 performs processing in accordance with the received command. For example, the microcomputer 103 performs the switching of channel selection in the tuner 105 and the switching of data input to the decoder 106 and data output from the decoder 106. In response to the instruction of the microcomputer 103, the decoder 106 outputs to the display 107 the video signal inputted from the tuner 105 or the HDMI/CEC communication unit 104, and outputs to the internal speaker 108 or the external output unit 109 the sound signal inputted from the tuner 105 or the HDMI/CEC communication unit 104.

Here, the memory 101 is an example of the holding unit of the video/sound output device according to the first embodiment of the invention. The remote controller receiver 102 is an example of the receiving unit of the video/sound output device according to the first embodiment of the invention. The microcomputer 103 is an example of the management unit and the control unit of the video/sound output device according to the first embodiment of the invention. The HDMI/CEC communication unit 104 is an example of the output unit of the video/sound output device according to the first embodiment of the invention.

Figure 4:
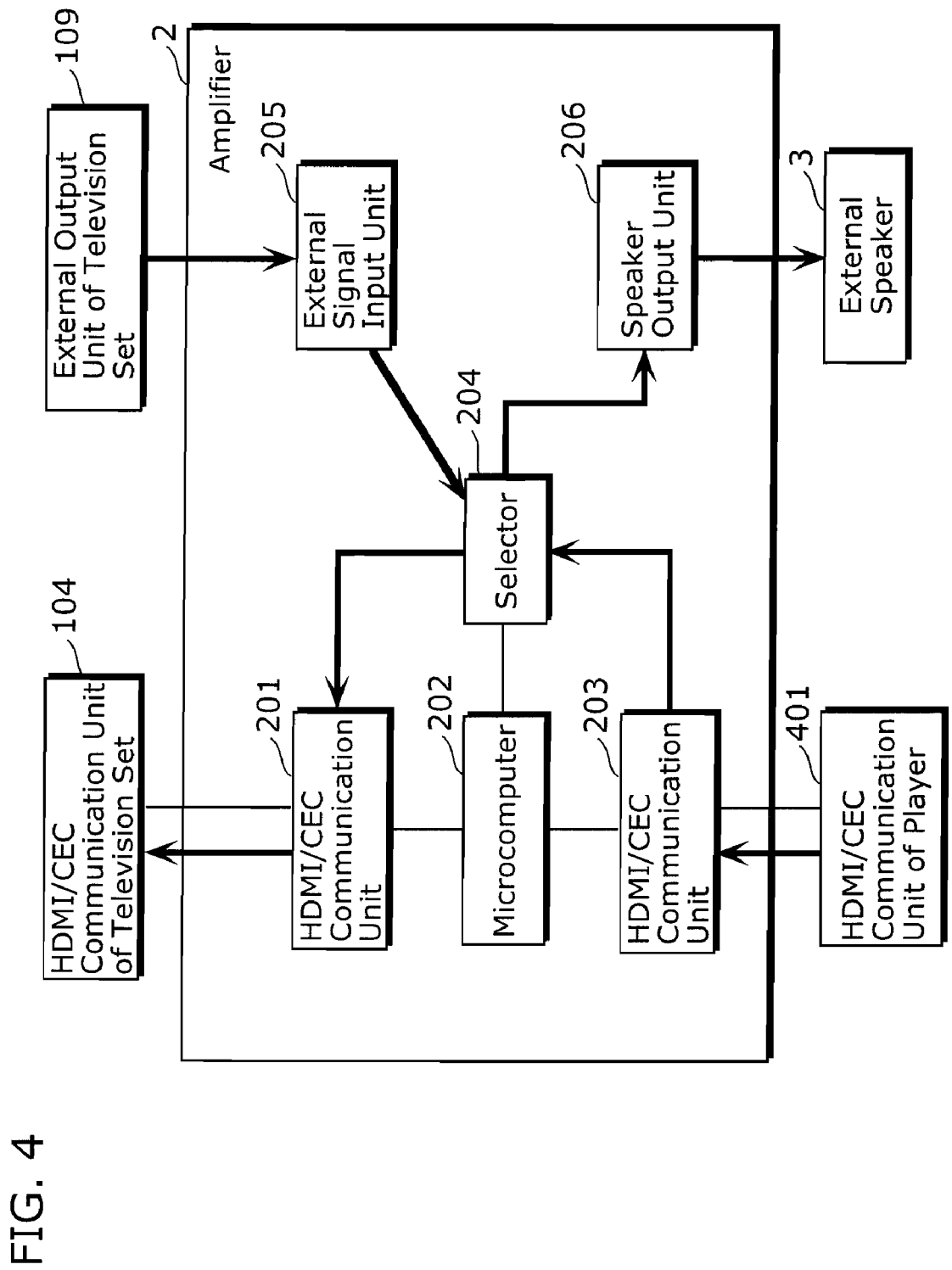
FIG. 4 is a block diagram showing a configuration of an amplifier according to the first embodiment.

FIG. 4 is a block diagram showing a configuration of the amplifier 2. The amplifier 2 includes an HDMI/CEC communication unit 201, a microcomputer 202, an HDMI/CEC communication unit 203, a selector 204, an external signal input unit 205 and a speaker output unit 206.

The microcomputer 202 performs processing in accordance with a CEC command received through the HDMI/CEC communication unit 201 or the HDMI/CEC communication unit 203. For example, the microcomputer 202 performs the input/output switching of the selector 204. In response to an instruction of the microcomputer 202, the selector 204 outputs to the HDMI/CEC communication unit 201 or the speaker output unit 206 the video signal and the sound signal inputted through the HDMI/CEC communication unit 203 or the sound signal inputted through the external signal input unit 205.

Here, the HDMI/CEC communication unit 201 is an example of the receiving unit of the external speaker control device according to the first embodiment of the invention. The microcomputer 202 is an example of the sound control unit of the external speaker control device according to the first embodiment of the invention.

Figure 5:
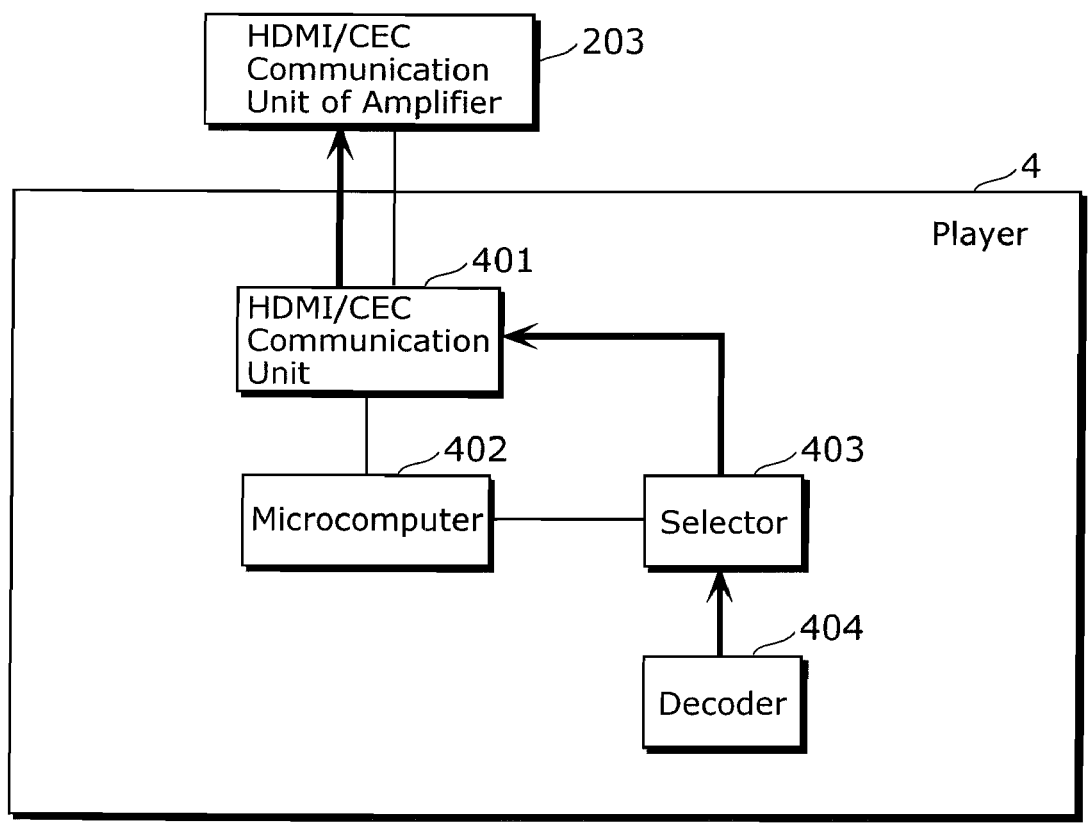
FIG. 5 is a block diagram showing a configuration of a player according to the first embodiment.

FIG. 5 is a block diagram showing a configuration of the player 4. The player 4 includes an HDMI/CEC communication unit 401, a microcomputer 402, a selector 403 and a decoder 404.

The microcomputer 402 performs processing in accordance with a CEC command received by the HDMI/CEC communication unit 401. For example, the microcomputer 402 performs the input/output switching of the selector 403. In response to an instruction of the microcomputer 402, the selector 403 outputs to the HDMI/CEC communication unit 401 a sound signal of any one channel mode among a plurality of channel modes (such as a monaural 2-ch and a 5.1-ch) decoded by the decoder 404.

Here, the HDMI/CEC communication unit 401 is an example of the receiving unit and the output unit of the sound signal output device according to the first embodiment of the invention. The selector 403 is an example of the selection unit of the sound signal output device according to the first embodiment of the invention.

Further, the selector 403 switches and selects the sound signal of any one channel mode among a plurality of channel modes decoded by the decoder 404. However, the decoder 404 may decode only the sound signal of the channel mode instructed from the microcomputer 402. That is, the selector 403 may notify the decoder 404 such as to decode the sound signal of the channel mode instructed from the microcomputer 402 but not to decode the sound signals of channel modes not instructed.

Further, the HDMI/CEC communication unit 401 of the player 4 shown in FIG. 5 is connected through an HDMI cable to the HDMI/CEC communication unit 203 of the amplifier 2 shown in FIG. 4. Further, the external speaker 3 shown in FIG. 2 is connected through a speaker cable to the speaker output unit 206 of the amplifier 2 shown in FIG. 4. Further, the HDMI/CEC communication unit 201 of the amplifier 2 shown in FIG. 4 is connected through an HDMI cable to the HDMI/CEC communication unit 104 of the television set 1 shown in FIG. 3. Further, the external signal input unit 205 of the amplifier 2 shown in FIG. 4 is connected through an optical cable to the external output unit 109 of the television set 1 shown in FIG. 3.

Here, in FIGS. 3 through 5, for the simplicity of understanding, the connection part implemented by the HDMI cable is indicated by two lines consisting of a line with an arrow and a line without an arrow. The line with an arrow indicates the path and the direction of the flow of a signal containing a video signal and a sound signal. The line without an arrow indicates the path of the flow of a CEC signal. The CEC signal flows bidirectionally. In an actual HDMI cable, these lines are bundled and accommodated in a single tube, and hence has the appearance of a single cable.

Figure 6:
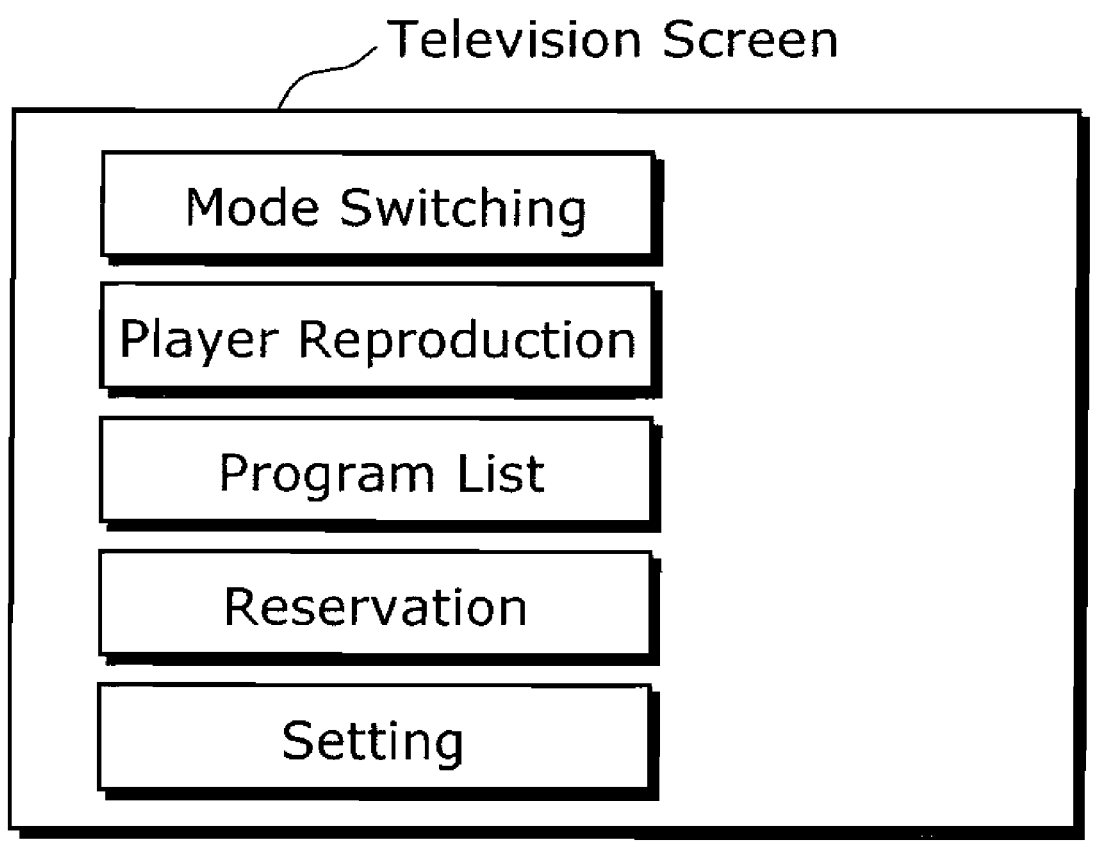
FIG. 6 is a diagram showing a menu screen according to the first embodiment.

FIG. 6 is a diagram showing a menu screen of the television set 1. The menu screen is generated by the microcomputer 103 that uses the menu screen information 111 stored in the memory 101.

Figure 7:
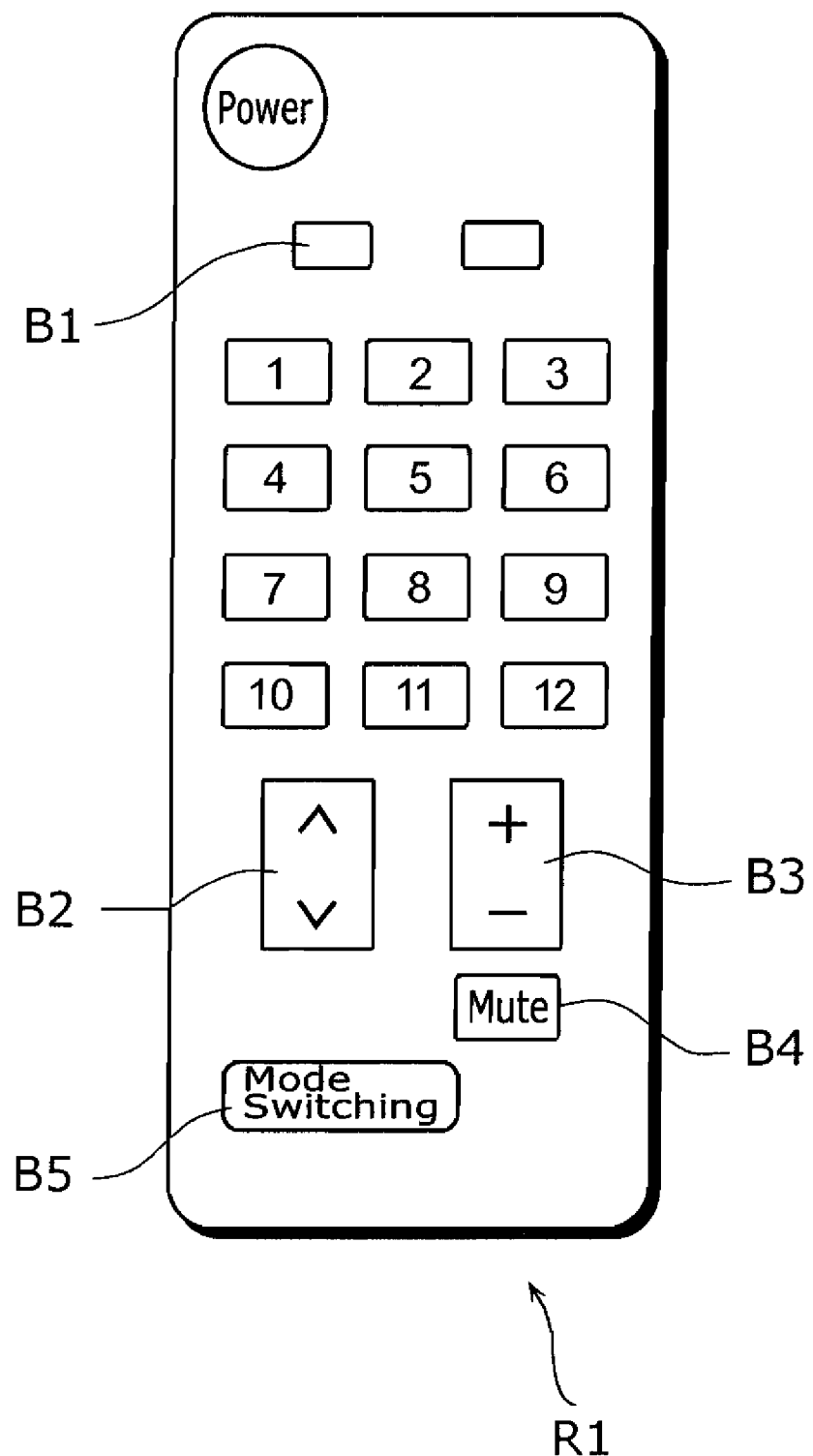
FIG. 7 is an external view of a remote controller for a television set according to the first embodiment.

FIG. 7 is an external view of a remote controller R1 of the television set 1. The remote controller R1 is a remote controller for operating the television set 1 by remote control, and includes a menu button B1, a channel switching button B2, a sound volume control button B3, a mute button B4, a mode switching button B5 and the like. The menu button B1 is a button for displaying various menus on the display 107. The channel switching button B2 is a button for switching the channel of the television set 1. The sound volume control button B3 is a button for adjusting the volume of the sound outputted from the internal speaker of the television set 1 and the like. The mode switching button B5 is described later.

(Definition of the Mode)

A "television mode" is defined as a state that sound is outputted from the internal speaker 108 of the television set 1 and that the sound output from the external speaker 3 connected to the amplifier 2 is muted. On the other hand, a "theater mode" is defined as a state that sound is outputted from the external speaker 3 connected to the amplifier 2 and that the sound output from the internal speaker 108 of the television set 1 is muted. When the sound output mode is a television mode, "0" is set into a mode flag 110 by the microcomputer 103. When the sound output mode is a theater mode, "1" is set into a mode flag 110 by the microcomputer 103.

Here, it is preferable that when the television set 1 is turned ON, the television set 1 starts up in a television mode. However, the mode before the power OFF may be held, so that the start up may be performed in the held mode.

(Viewing and Listening of a Broadcast Program)

First, a case is described that in a television mode, a user views and listens to a broadcast program received by the television set 1.

In a television mode, in the television set 1, the video signal received through the tuner 105 is outputted to the display 107, while the sound signal received through the tuner 105 is outputted to the internal speaker 108 and the external output unit 109. The sound signal inputted to the internal speaker 108 is outputted as sound from the internal speaker 108 by the microcomputer 103. At that time, the value "0" indicating a television mode is being set in the mode flag 110 in the memory 101. Further, the amplifier 2 is in a power OFF (standby) state, or alternatively the output sound from the speaker output unit 206 is muted by the microcomputer 202, so that sound is not outputted from the external speaker 3 connected to the amplifier 2.

In a theater mode, in the television set 1, the video signal received through the tuner 105 is outputted to the display 107, while the sound signal received through the tuner 105 is outputted to the external output unit 109. The output sound from the internal speaker 108 is muted by the microcomputer 103. At that time, the value "1" indicating a theater mode is being set in the mode flag 110 in the memory 101. Further, in the amplifier 2, the sound signal inputted from the television set 1 to the external signal input unit 205 is outputted to the speaker output unit 206 by the microcomputer 202, so that sound is outputted from the external speaker 3 connected to the amplifier 2.

(Mode Switching in Broadcast Program Viewing and Listening)

When a user presses the menu button of the remote controller of the television set 1, a menu shown in FIG. 6 is generated by the microcomputer 103 and then displayed on the display 107. When the GUI button "mode switching" is selected, the microcomputer 103 refers to the mode flag 110 and then switches the mode into one different from the mode presently set up in the mode flag 110.

That is, when the value held in the mode flag 110 has been "0" so that the sound output mode has been a television mode, the microcomputer 103 sets the value of the mode flag 110 to be the value "1" of a theater mode and thereby instructs the decoder 106 to mute the output sound from the internal speaker 108. Thus, the decoder 106 mutes the output sound from the internal speaker 108. A sound signal is outputted to the external output unit 109.

Further, the microcomputer 103 notifies through the HDMI/CEC communication unit 104 to the amplifier 2 a CEC command indicating that the sound output mode of the television set 1 has been changed from a television mode to a theater mode. When the HDMI/CEC communication unit 201 of the amplifier 2 receives the CEC command, the microcomputer 202 instructs the selector 204 to output to the speaker output unit 206 the sound signal inputted through the external signal input unit 205. As a result, when the selector 204 cancels the mute state of the speaker output unit 206, the sound based on the sound signal from the television set 1 is outputted from the external speaker 3.

Here, with taking into consideration the case that the amplifier 2 is in a power OFF (standby) state, it is preferable that the microcomputer 103 of the television set 1 first issues to the amplifier 2 a CEC command instructing a startup, and then on completion of the startup of the amplifier 2, performs the above-mentioned mode switching processing.

On the other hand, when the value held in the mode flag 110 has been "1" so that the sound output mode has been a theater mode, the microcomputer 103 sets the value of the mode flag 110 to be the value "0" of a television mode and thereby instructs the decoder 106 to cancel the mute state of the internal speaker 108. Thus, the decoder 106 cancels the mute state of the internal speaker 108.

Further, the microcomputer 103 notifies through the HDMI/CEC communication unit 104 to the amplifier 2 a CEC command indicating that the sound output mode of the television set 1 has been changed from a theater mode to a television mode. When the HDMI/CEC communication unit 201 of the amplifier 2 receives the CEC command, the microcomputer 202 instructs the selector 204 to mute the output sound from the speaker output unit 206. As a result, when the selector 204 mutes the output sound from the speaker output unit 206, the sound based on the sound signal from the television set 1 is not outputted from the external speaker 3. Further, after that, the amplifier 2 may be brought into a power OFF (standby) state. A technique for controlling the power of the amplifier 2 is described in the fifth embodiment.

(Reproduced Contents Viewing and Listening)

Next, a case is described that a user views and listens to contents reproduced by the player 4.

In a television mode, the video signal and the sound signal outputted from the player 4 are inputted to the HDMI/CEC communication unit 104 of the television set 1 via the HDMI/CEC communication unit 203, the selector 204 and the HDMI/CEC communication unit 201 of the amplifier 2. The video signal is outputted through the decoder 106 to the display 107, while the sound signal is outputted to the internal speaker 108 and the external output unit 109. At that time, the value "0" indicating a television mode is being set in the mode flag 110 in the memory 101. Further, the amplifier 2 is in a power OFF (standby) state, or alternatively the output sound from the speaker output unit 206 is muted, so that sound is not outputted from the external speaker 3 connected to the amplifier 2.

In a theater mode, the video signal and the sound signal outputted from the player 4 are inputted to the HDMI/CEC communication unit 203 of the amplifier 2. The video signal is inputted to the HDMI/CEC communication unit 104 of the television set 1 via the selector 204 and the HDMI/CEC communication unit 201, and then outputted through the decoder 106 to the display 107. At that time, the value "1" indicating a theater mode is being set in the mode flag 110 in the memory 101. The sound signal is outputted to the speaker output unit 206 via the selector 204 of the amplifier 2, so that the sound is outputted from the external speaker 3. At that time, the internal speaker 108 of the television set 1 is in a mute state.

(Mode Switching in Reproduced Contents Viewing and Listening)

When a user presses the menu button of the remote controller of the television set 1, a menu shown in FIG. 6 is generated by the microcomputer 103 and then displayed on the display 107. When the GUI button "mode switching" is selected, the microcomputer 103 refers to the mode flag 110 and then switches the mode into one different from the mode presently set up in the mode flag 110.

That is, when the value held in the mode flag 110 has been "0" so that the sound output mode has been a television mode, the microcomputer 103 sets the value of the mode flag 110 to be the value "1" of a theater mode and thereby instructs the decoder 106 to mute the output sound from the internal speaker 108. Thus, the decoder 106 mutes the output sound from the internal speaker 108. A sound signal is outputted to the external output unit 109.

Further, the microcomputer 103 notifies through the HDMI/CEC communication unit 104 to the amplifier 2 a CEC command indicating that the mode of the television set 1 has been changed into a theater mode. When the HDMI/CEC communication unit 201 of the amplifier 2 receives the CEC command, the microcomputer 202 instructs the selector 204 to output to the speaker output unit 206 the sound signal inputted through the HDMI/CEC communication unit 203. As a result, when the selector 204 cancels the mute state of the speaker output unit 206, the sound based on the sound signal from the player 4 is outputted from the external speaker 3.

Here, with taking into consideration the case that the amplifier 2 is in a power OFF (standby) state, it is preferable that the microcomputer 103 of the television set 1 first issues to the amplifier 2 a CEC command instructing a startup, and then on completion of the startup of the amplifier 2, performs the above-mentioned mode switching processing.

On the other hand, when the value held in the mode flag 110 has been "1" so that the sound output mode has been a theater mode, the microcomputer 103 sets the value of the mode flag 110 to be the value "1" of a television mode and thereby instructs the decoder 106 to cancel the mute state of the internal speaker 108. Thus, the decoder 106 cancels the mute state of the internal speaker 108.

Further, the microcomputer 103 notifies through the HDMI/CEC communication unit 104 to the amplifier 2 a CEC command indicating that the television set 1 has been changed to a television mode. When the HDMI/CEC communication unit 201 of the amplifier 2 receives the CEC command, the microcomputer 202 instructs the selector 204 to mute the output sound from the speaker output unit 206. As a result, when the selector 204 mutes the output sound from the speaker output unit 206, the sound signal from the player 4 is not outputted from the external speaker 3. Further, after that, the amplifier 2 may be brought into a power OFF (standby) state.

Here, in the above-mentioned case, the CEC commands sent from the television set 1 to the amplifier 2 for the purpose of switching the sound output mode are a command indicating a theater mode and a command indicating a television mode. Among these, the former may be a command for canceling the mute state of the speaker of the amplifier 2, while the latter may be a command for bringing the speaker of the amplifier 2 into a mute state.

Further, the GUI button for switching the sound output mode may be displayed in a toggled state. That is, when the value held in the mode flag 110 is "0" so that the sound output mode is a television mode, in place of the "mode switching" (see FIG. 6), "switching to a theater mode" or the like may be displayed as a GUI button. Further, when the value held in the mode flag 110 is "1" so that the sound output mode is a theater mode, in place of the "mode switching" (see FIG. 6), "switching to a television mode" or the like may be displayed as a GUI button. In this case, when the "switching to a theater mode" or the like is selected, the microcomputer 103 sets the value of the mode flag 110 to be the value "0" of a theater mode. When the "switching to a television mode" or the like is selected, the microcomputer 103 sets the value of the mode flag 110 to be the value "1" of a television mode.

Further, in the above-mentioned case, switching of the sound output mode is performed using the GUI. However, as shown in FIG. 7, a mode switching button B5 may be provided in the remote controller R1 of the television set 1. Then, using the mode switching button B5, the user may switch the sound output mode. Thereby, the above-mentioned switching of the sound output mode can be realizable by easier operation. Further, in place of providing the mode switching button B5 in the remote controller R1 of the television set 1, a similar function may be assigned to an existing button. For example, when the existing mute button B4 is pressed long for a few seconds, the mute button B4 may serve as a mode switching button. Further, when the existing mute button B4 is pressed for a short time in a normal manner, the mute button B4 may serve as a mute button in a normal manner.

Further, in the above-mentioned case, the television set 1 notifies to the amplifier 2 whether the mode is a television mode or a theater mode. However, the television set 1 may notify it to the player 4. Alternatively, the amplifier 2 may notify to the player 4 the mode information received from the television set 1 (information concerning whether the mode is a television mode or a theater mode). Thereby, the following effects are obtained.

That is, in some cases, the player 4 can select any one of a 2-ch sound signal and a 5.1-ch sound signal as a sound signal that can be outputted. In such cases, it is preferable that the player 4 outputs the 2-ch sound signal in a television mode, and outputs the 5.1-ch sound signal in a theater mode. Thus, the microcomputer 402 controls the selector 403 to output the 2-ch sound signal decoded by the decoder 404 in a television mode and output the 5.1-ch sound signal decoded by the decoder 404 in a theater mode. In the player 4, the HDMI/CEC communication unit 401 receives a CEC command notifying the mode from the television set 1 or the amplifier 2. Then, the microcomputer 402 interprets the CEC command, so that the sound signal corresponding to the notified mode is outputted to the amplifier 2. Conventionally, the user need have recognized the capability of the player 4 and then switched the sound output signal at each time of changing the speaker for sound output. However, according to the above-mentioned configuration, the television set 1 recognizes and notifies the mode. Thus, without the user operation, the player 4 can switch the sound output signal appropriately. This avoids the necessity of bothering complicated operations by the user, and hence improves usage easiness.

Here, such a function may be provided in the television set 1 in addition to the player 4. That is, when any one of a 2-ch sound signal and a 5.1-ch sound signal can be selected as a sound signal that can be outputted, it is preferable that the television set 1 outputs the 2-ch sound signal in a television mode, and outputs the 5.1-ch sound signal in a theater mode.

(Sound Volume Adjustment)

Next, sound volume adjustment is described.

When a user presses a sound volume up button or a sound volume down button of the remote controller of the television set 1, the remote controller receiver 102 receives a command corresponding to the pressed button from the remote controller of the television set 1. The microcomputer 103 refers to the mode flag 110 in the memory 101. Then, when the value held in the mode flag 110 is "0" so that the sound output mode is a television mode, the microcomputer 103 increases or reduces the sound volume of the internal speaker 108 via the decoder 106.

On the other hand, when the value held in the mode flag 110 is "1" so that the sound output mode is a theater mode, the microcomputer 103 transmits through the HDMI/CEC communication unit 104 to the amplifier 2 a CEC command for increasing or reducing the sound volume.

When the HDMI/CEC communication unit 201 of the amplifier 2 receives the CEC command from the television set 1, the microcomputer 202 adjusts via the selector 204 the amplitude of the output sound signal from the speaker output unit 206, and thereby increases or reduces the volume of the output sound from the external speaker 3.

By virtue of this, regardless of a television mode or a theater mode, the user can adjust the volume of the output sound by performing the same operation for the television set 1. This avoids the prior art necessity that the user should select an operating target device depending on the mode, and hence improves the user's operation easiness.

FIG. 8 is a diagram showing an example of display indicating that sound volume adjustment is on going according to the first embodiment.

Figure 8A:
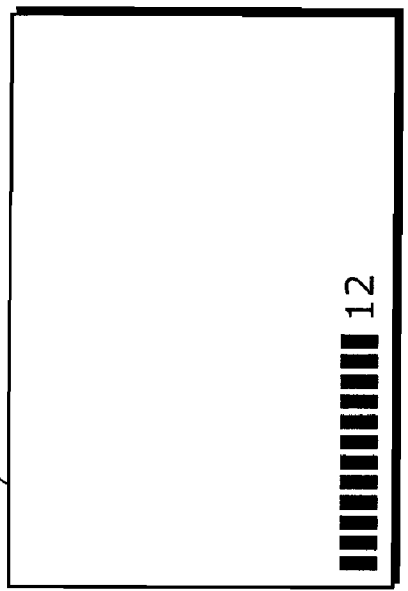
FIG. 8 is a diagram showing an example of display indicating that sound volume adjustment is on going according to the first embodiment.

At the time of the above-mentioned sound volume adjustment operation, the display 107 of the television set 1 may display information indicating that sound volume adjustment is on going. For example, as shown in FIG. 8(A), the display 107 may display the level of the volume of the sound outputted from the internal speaker 108 of the television set 1 or the speaker output unit 206 of the amplifier 2, by using a numerical value or a graph. Further, the display 107 may display in different colors the sound volume level of the television set 1 and the sound volume level of the amplifier 2. Further, the display 107 may display "amplifier", "television set" or the like, and thereby indicate which sound volume level is displayed. This allows the user to easily recognize which sound volume level is displayed.

Here, in order that the television set 1 may display the sound volume level of the amplifier 2, the microcomputer 202 of the amplifier 2 may transmit the sound volume level of the amplifier 2 by a CEC command to the television set 1 via the HDMI/CEC communication unit 201. In the television set 1, the HDMI/CEC communication unit 104 receives the command. Then, the microcomputer 103 causes a GUI generating unit (not shown) to draw an image for specifying the sound volume level, and then displays the image on the display 107 in an overlay manner.

Figure 8C:
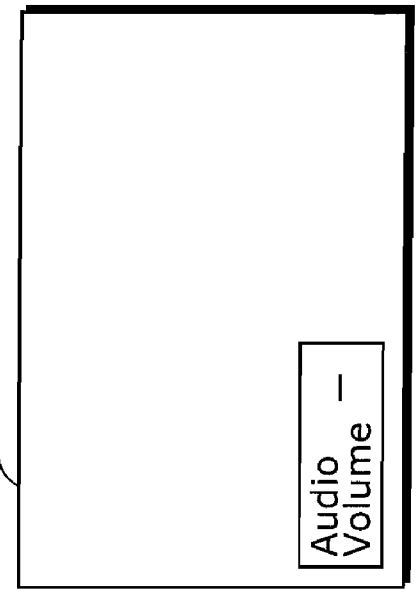
Figure 8B:
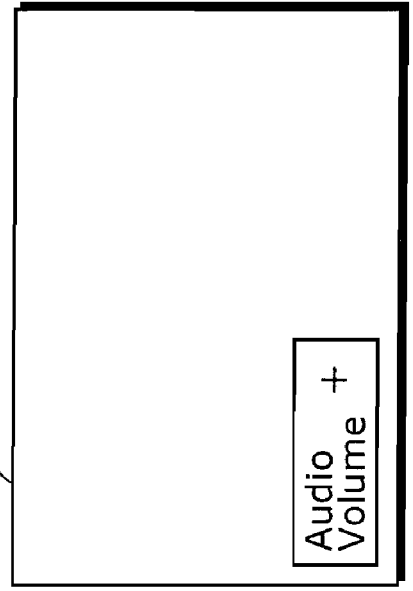

Further, at the time of the sound volume adjustment, during the sound volume Lip operation, the display may be as shown in FIG. 8(B). During the sound volume down operation, the display may be as shown in FIG. 8(C). In this case, information indicating that the sound volume is being increased or reduced is solely displayed, whereas the sound volume level is not displayed. This avoids the necessity that the amplifier 2 should transmit to the television set 1 the sound volume level by a CEC command every time. This reduces the processing load on the microcomputer 202 and the microcomputer 103.

(Replacement to a Device Having an Extended Function)

Figure 9:
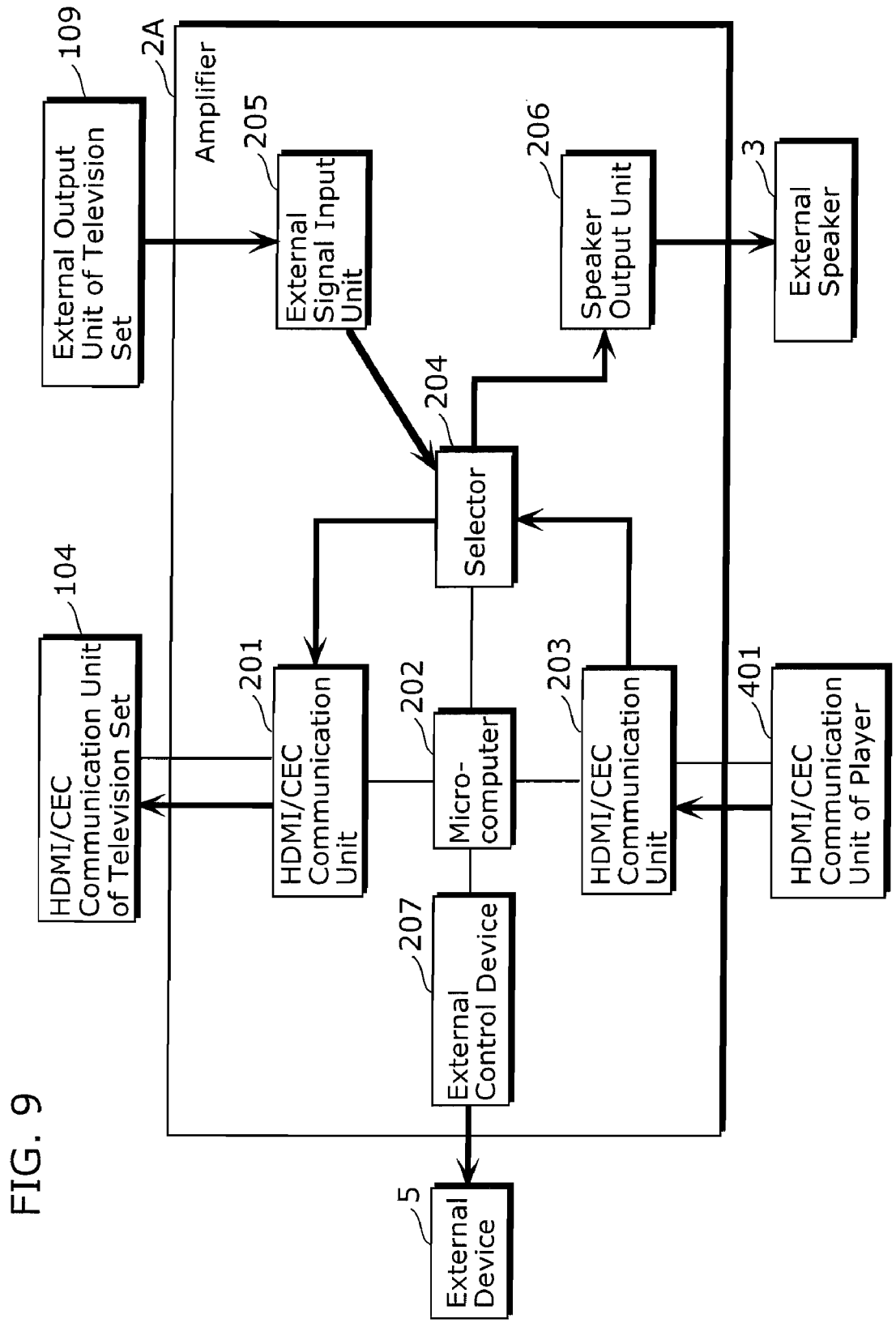
FIG. 9 is a block diagram showing a configuration of an amplifier having an extended function according to the first embodiment.

FIG. 9 is a block diagram showing a configuration of an amplifier 2A having an extended function. In the amplifier 2A, an external control function is added as an extended function to the amplifier 2 in FIG. 4. That is, the amplifier 2A includes an HDMI/CEC communication unit 201, a microcomputer 202, an HDMI/CEC communication unit 203, a selector 204, an external signal input unit 205, a speaker output unit 206 and an external control unit 207.

The microcomputer 202 performs processing in accordance with a CEC command received through the HDMI/CEC communication unit 201 or the HDMI/CEC communication unit 203. For example, the microcomputer 202 performs the input/output switching of the selector 204 and the control of the external control unit 207. In response to an instruction of the microcomputer 202, the selector 204 outputs to the HDMI/CEC communication unit 201 or the speaker output unit 206 the video signal and the sound signal inputted through the HDMI/CEC communication unit 203 or the sound signal inputted through the external signal input unit 205. In response to the instruction of the microcomputer 202, the external control unit 207 controls an external device 5 connected to the amplifier 2A.

In the first embodiment, the external device 5 is a lighting device. The amplifier 2A controls the lighting device (external device 5), and thereby adjusts the lighting of a room in which the television set 1 is installed.

The HDMI/CEC communication unit 201 of the amplifier 2A receives, from the television set 1, mode information indicating that the sound output mode is either a television mode or a theater mode.

When the sound output mode is a theater mode, the microcomputer 202 instructs the external control unit 207 to light down the lighting device. Further, when the sound output mode is a television mode, the microcomputer 202 instructs the external control unit 207 to light up the lighting device. By virtue of this, the external control unit 207 darkens the lighting of the room in a theater mode, and brightens the lighting of the room in a television mode.

As a result, even when the amplifier 2 without the function of controlling the lighting is replaced by the amplifier 2A with the function of controlling the lighting, the lighting device (the external device 5) can be controlled in accordance with the mode information without changing the information (mode information) notified by the television set 1 (that is, without replacing the television set or updating the software of the television set).

Here, in the first embodiment, an example has been described that the external device 5 is a lighting device. However, the external device 5 may be a curtain opening/closing device or an air-conditioning device. In this case, the external control unit 207 controls the operation of the external device 5 in accordance with the mode information (the operation of opening and closing the curtain or the operation of air conditioning).

As such, even when the amplifier 2 is replaced by the amplifier 2A having the function for controlling the operation of the external device 5, the user can use the new function of the amplifier 2A without replacing the television set 1.

Further, in the first embodiment described above, at each time that the user selects "mode switching" of the menu shown in FIG. 6, the mode is switched from a television mode to a theater mode or alternatively from a theater mode to a television mode. However, when the user selects the "program list" of the menu shown in FIG. 6 and thereby selects a particular program, a theater mode may be selected. The particular program may be determined individually, or alternatively may be a program of a particular kind such as movie and music. In this case, when the user selects a program (for example, a news program) other than the above-mentioned particular program, a television mode may be selected.

(Input Switching)

Next, a case that in a switching manner, a user views and listens to a broadcast program received by the television set 1 and the contents reproduced from the player 4 is described with reference to FIGS. 3 through 6.

In the television set 1, switching of the signal inputted to the decoder 106 is referred to as "input switching". That is, in the configuration of FIG. 3, the operation in which a state that a broadcast program received by the tuner 105 is inputted to the decoder 106 and then displayed on the display 107 is switched to a state that a video signal inputted to the HDMI/CEC communication unit 104 is inputted to the decoder 106 and then displayed on the display 107 or its reverse operation is referred to as "input switching".

When a user is viewing and listening to a broadcast program in a theater mode, the video signal of the broadcast program received by the tuner 105 is inputted through the decoder 106 to the display 107. Further, in this case, the sound signal of the above-mentioned broadcast program is inputted from the external output unit 109 through the decoder 106 to the external signal input unit 205 of the amplifier 2, and then outputted from the speaker output unit 206 through the selector 204 to the external speaker 3. At that time, the video supplying source (referred to as the "source", hereinafter) is the television set 1.

In this state, when a user selects "player reproduction" in the menu screen of the television set in FIG. 6, the microcomputer 103 issues through the HDMI/CEC communication unit 104 to the player 4 a CEC command instructing a reproduction start. The player 4 receives this CEC command, then starts reproduction of the contents, and then notifies a CEC command indicating that the player 4 has become the source, to each device connected through the HDMI cable. Alternatively, when the user performs instruction by using the reproduction button of a main body of the player 4 or the remote controller of the player 4 so that the player 4 starts reproduction of the contents, or alternatively when the user inserts a disk into the player 4 so that the player 4 starts reproduction of the contents, the player 4 similarly notifies a CEC command indicating that the player 4 has become the source, to each device connected through the HDMI cable.

When receiving this CEC command, the microcomputer 202 of the amplifier 2 detects that the source has been switched from the television set 1 to the player 4. Then, the microcomputer 202 switches the selector 204, and thereby output to the speaker output unit 206 the sound signal inputted from the HDMI/CEC communication unit 401 of the player 4 to the HDMI/CEC communication unit 203. Further, the microcomputer 202 switches the selector 204, and thereby output to the television set 1 the video signal inputted from the HDMI/CEC communication unit 401 of the player 4 to the HDMI/CEC communication unit 203.

Likewise, when receiving the CEC command indicating that the player 4 has become the source, the microcomputer 103 of the television set 1 detects that the player 4 has become the source. Then, the microcomputer 103 outputs to the decoder 106 the video signal received by the HDMI/CEC communication unit 104 into which the signal from the player 4 is inputted. Thereby, the video based on the video signal from the player 4 is displayed on the display 107.

In contrast, in a case that the player 4 is the source, when a user selects a broadcast program by means of channel switching in the television set 1 by using the remote controller or the like, the microcomputer 103 of the television set 1 outputs to the decoder 106 the video signal received through the tuner 105 and thereby switches the broadcast program to be displayed on the display 107. At the same time, the microcomputer 103 transmits a CEC command indicating that the television set 1 has become the source, to each device connected through the HDMI cable.

When receiving this CEC command, the microcomputer 202 of the amplifier 2 detects that the source has been switched to the television set 1. Then, the microcomputer 202 switches the selector 204, and thereby output to the speaker output unit 206 the sound signal inputted from the external output unit 109 of the television set 1 to the external signal input unit 205.

When receiving the CEC command from the television set 1, the player 4 can detect that the player 4 is no longer the source. Thus, reproduction may be stopped when necessary. Obviously, the reproduction may be continued.

As described above, the amplifier 2 has the function of determining the source device based on the notification of the CEC command and then performing selective switching between the input from the player 4 through the HDMI cable and the input from the television set 1 through the optical cable. Thereby, a sound signal in accordance with the source can be outputted to the external speaker 3.

Even when the user is viewing and listening in a television mode, the player 4 or the television set 1 similarly notifies to each device a CEC command indicating that itself has become the source. Thereby, input switching of the video signal and the sound signal can be performed in accordance with the source. That is, when the user who is viewing and listening to the broadcast program received through the tuner 105 of the television set 1 causes the player 4 to reproduce the contents, the player 4 notifies to each device a CEC command indicating that the player 4 has become the source. When receiving this notification, the microcomputer 103 of the television set 1 switches the decoder 106 input to be the signal from the HDMI/CEC communication unit 104. In contrast, when the user who is viewing and listening to the contents reproduced by the player 4 selects the broadcast program received through the tuner 105 of the television set 1, the television set 1 notifies to each device a CEC command indicating that the television set 1 has become the source. Thereby, the player 4 can detect that itself is no longer the source, and thereby performs appropriate processing such as reproduction stopping.

(Power Linkage)

In the above, description has been given that a device notifies a CEC command indicating that the mode is a television mode or a theater mode or a CEC command indicating that itself is the source so that the device having received the notification performs appropriate operation. The contents of the notification may indicate other states. For example, when a device goes into a power OFF (standby) state, the "standby state" may be notified by a CEC command. In this case, the following operation is possible.

That is, when the amplifier 2 notifies a "standby state" to each device, the television set 1 goes into a television mode in response to this notification. Thereby, when the user under viewing and listening in a theater mode presses the power button or the like of the main body of the amplifier 2 so that the amplifier 2 goes into a standby state, the mode is switched from a theater mode to a television mode so that sound is outputted from the internal speaker 108 of the television set 1. By virtue of this, the user can continue the viewing and listening without a special operation of input switching.

Further, when the television set 1 notifies a "standby state" to each device, the amplifier 2 and the player 4 also go into a power OFF (standby) state. This avoids the time and effort that the user turns OFF individual devices. Nevertheless, in some cases such as a case that the player 4 is in music reproduction, the amplifier 2 and the player 4 are solely used without the use of the television set 1. Accordingly, in a case that the player 4 should not be turned OFF because of being under the contents reproduction or the like, even when the "standby state" is notified from the television set 1, the amplifier 2 and the player 4 need not go into a power OFF (standby) state.

Further, when the player 4 notifies a "standby state" to each device, the microcomputer 103 of the television set 1 having received the notification switches the decoder 106 input signal, from the signal provided from the HDMI/CEC communication unit 104 to the signal provided from the tuner 105. As a result, the television set 1 becomes the source. Thus, the television set 1 notifies to each device a CEC command indicating that the television set 1 has become the source. Thereby, as described above, the amplifier 2 having received the notification can appropriately switch the input of the sound signal. Alternatively, in a case that the player 4 is reproducing the contents, when the reproduction is stopped, the player 4 may notify a "reproduction stop" to each device. Then, the television set 1 can perform input switching similarly to the above-mentioned case.

In contrast, when the player 4 starts reproduction of the contents, the player 4 may notify a "reproduction start" to each device. Then, the television set 1 can start up automatically.

Embodiment 2

(Example of Use of a Set-Top Box: 1)

An embodiment of use of a set-top box is described below.

When a user uses a cable television set, a set-top box is used for receiving a cable television broadcast. A set-top box according to the second embodiment includes an HDMI output unit connected to an HDMI cable and an optical output unit connected to an optical cable. The HDMI output unit can output a video signal and a 2-ch sound signal. The optical output unit can output a 5.1-ch sound signal. Further, the set-top box has a dedicated remote controller. Using this remote controller, a user can perform channel switching, menu displaying and menu operation. The remote controller has a sound volume control button for the television set. Using the remote controller of the set-top box, a user can control the sound volume of the television set.

Figure 10:
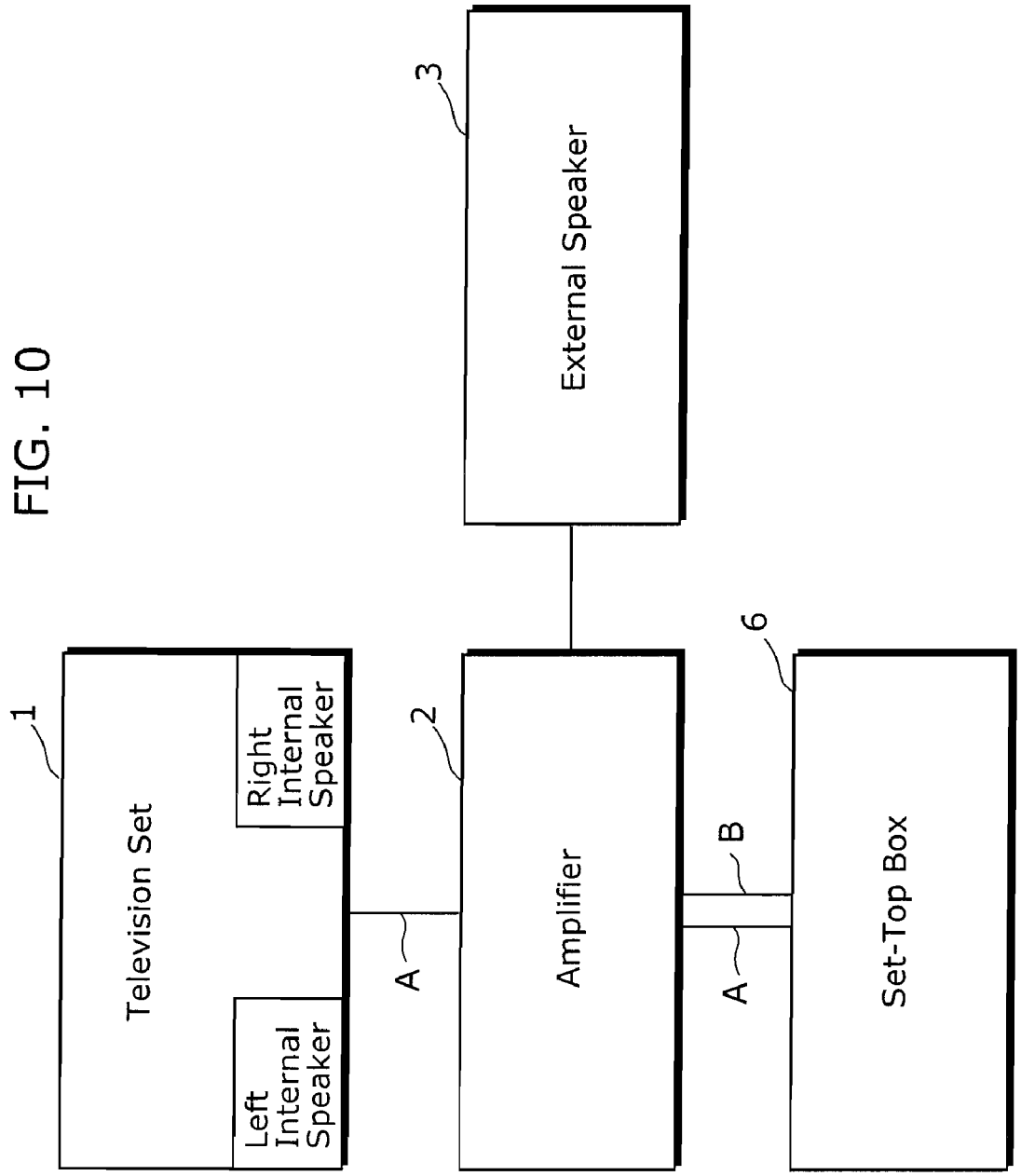
FIG. 10 is a diagram showing a configuration of a system including a set-top box according to the second embodiment.

FIG. 10 is a diagram showing a configuration of a system according to the second embodiment that includes a set-top box.

The amplifier 2 and the set-top box 6 are interconnected through an HDMI cable A, so that the video signal and the sound signal reproduced by the set-top box 6 are inputted to the amplifier 2. The television set 1 and the amplifier 2 are also interconnected through an HDMI cable A, so that a video signal and a sound signal outputted from the amplifier 2 are inputted to the television set 1. The amplifier 2 and the set-top box 6 are interconnected also through an optical cable B so that the sound signal outputted from the set-top box 6 is inputted to the amplifier 2. Here, the external view of the system according to the second embodiment is similar to that of the first embodiment (FIG. 1), and hence detailed description is omitted.

The television set 1, the amplifier 2 and the set-top box 6 can communicate CEC commands to each other via the CEC lines of the HDMI cables.

The configuration of the television set 1 is as shown in FIG. 3, while the configuration of the amplifier 2 is shown in FIG. 4.

Figure 11:
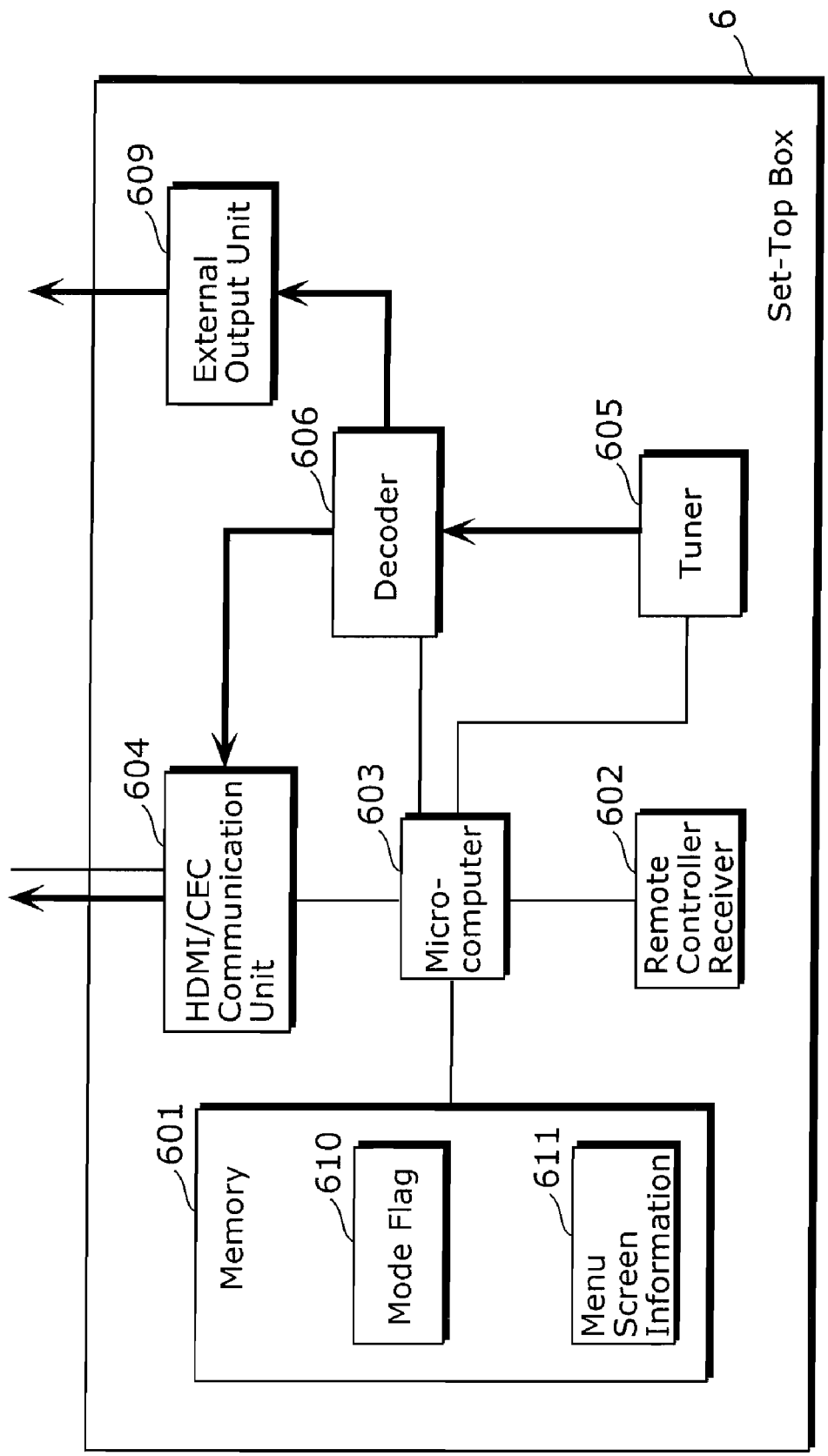
FIG. 11 is a block diagram showing a configuration of a set-top box according to the second embodiment.

FIG. 11 is a block diagram showing the configuration of a set-top box 6. The set-top box 6 includes a memory 601, a remote controller receiver 602, a microcomputer 603, an HDMI/CEC communication unit 604, a tuner 605, a decoder 606 and an external output unit 609. The memory 601 stores a mode flag 610 and menu screen information 611.

When the remote controller receiver 602 receives a command from a remote controller (not shown) of the set-top box 6, the microcomputer 603 performs processing in accordance with the received command. For example, the microcomputer 603 performs the switching of channel selection in the tuner 605 and the switching of data output from the decoder 606. The decoder 606 outputs the video signal and the sound signal inputted from the tuner 605, to the HDMI/CEC communication unit 604 or the external output unit 609 in response to the instruction of the microcomputer 603.

Here, the set-top box 6 is an example of the video/sound output device according to the second embodiment of the invention. Further, the memory 601 is an example of the holding unit of the video/sound output device according to the second embodiment of the invention. The remote controller receiver 602 is an example of the receiving unit of the video/sound output device according to the second embodiment of the invention. The microcomputer 603 is an example of the management unit of the video/sound output device according to the second embodiment of the invention. The HDMI/CEC communication unit 404 is an example of the output unit of the video/sound output device according to the second embodiment of the invention.

Further, the HDMI/CEC communication unit 604 of the set-top box 6 shown in FIG. 9 is connected through an HDMI cable to the HDMI/CEC communication unit 203 of the amplifier 2 shown in FIG. 4. Further, the external speaker 3 shown in FIG. 10 is connected through a speaker cable to the speaker output unit 206 of the amplifier 2 shown in FIG. 4. Further, the HDMI/CEC communication unit 201 of the amplifier 2 shown in FIG. 4 is connected through an HDMI cable to the HDMI/CEC communication unit 104 of the television set 1 shown in FIG. 3. Further, the external signal input unit 205 of the amplifier 2 shown in FIG. 4 is connected through an optical cable to the external output unit 609 of the set-top box 6 shown in FIG. 11.

Here, in FIGS. 3, 4 and 11, for the simplicity of understanding, the connection part implemented by the HDMI cable is indicated by two lines consisting of a line with an arrow and a line without an arrow. The line with an arrow indicates the path and the direction of the flow of a signal containing a video signal and a sound signal. The line without an arrow indicates the path of the flow of a CEC signal. The CEC signal flows bidirectionally. In an actual HDMI cable, these lines are bundled and accommodated in a single tube, and hence has the appearance of a single cable.

Figure 12:
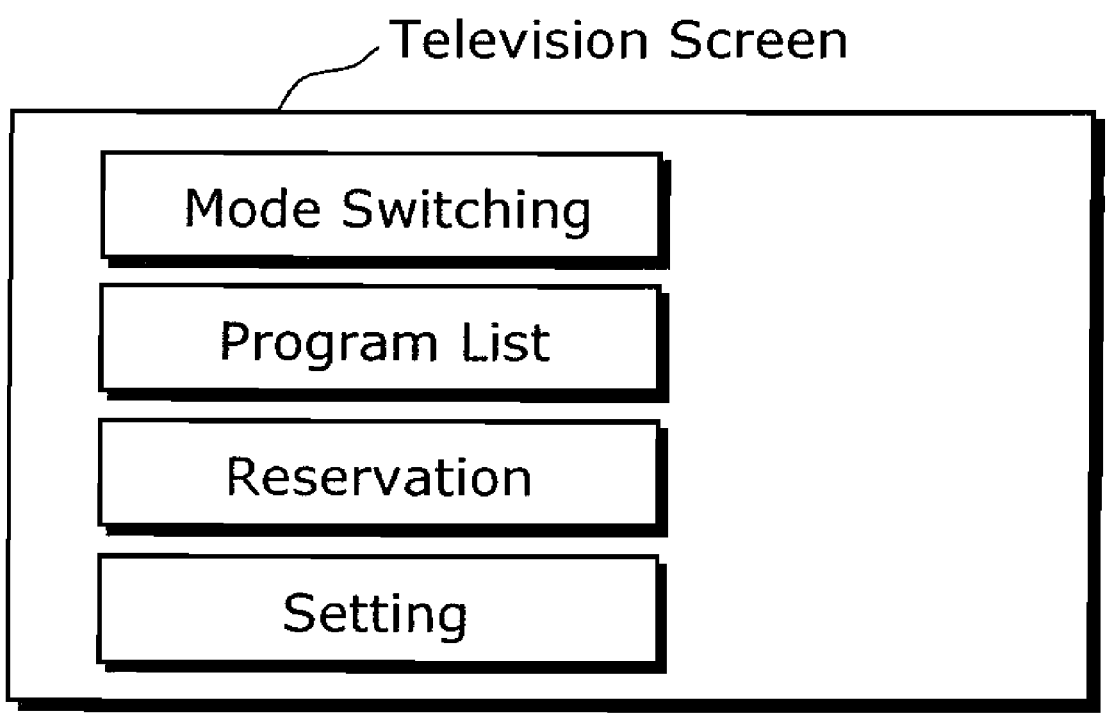
FIG. 12 is a diagram showing a menu screen of a set-top box according to the second embodiment.

FIG. 12 is a diagram showing a menu screen of the set-top box 6. The menu screen is generated by the microcomputer 603 that uses the menu screen information 611 stored in the memory 601. The generated menu screen is outputted from the HDMI/CEC communication unit 604, then inputted through the HDMI cable to the television set 1, and then displayed on the display 107. With viewing this screen, when a user operates the remote controller button of the set-top box 6 toward the set-top box 6, the user can operate the menu.

(Broadcast Program Viewing and Listening Using a Set-Top Box: 1)

A case is described that in a television mode, a user views and listens to a broadcast program received by the set-top box 6.

In a television mode, in the set-top box 6, the video signal received through the tuner 605 is outputted from the HDMI/CEC communication unit 604 via the decoder 606. The sound signal received through the tuner 605 is inputted to the decoder 606 so that a 2-ch sound signal is outputted from the HDMI/CEC communication unit 604. A 5.1-ch sound signal may be outputted from the external output unit 609.

At that time, the value "0" indicating a television mode is being set in the mode flag 610 in the memory 601. Further, the amplifier 2 is in a power OFF (standby) state, or alternatively the output sound from the speaker output unit 206 is muted by the microcomputer 202, so that sound is not outputted from the external speaker 3 connected to the amplifier 2. Further, the value "0" indicating a television mode is being set in the mode flag 110 in the memory 101 of the television set 1.

The video signal and the sound signal outputted from the HDMI/CEC communication unit 604 of the set-top box 6 is inputted through the amplifier 2 to the HDMI/CEC communication unit 104 of the television set 1, and then decoded by the decoder 106. As a result, the display 107 displays the video, while the internal speaker 108 outputs the sound.

In a theater mode, in the set-top box 6, the video signal received through the tuner 605 is outputted from the HDMI/CEC communication unit 604 via the decoder 606. The sound signal received through the tuner 605 is inputted to the decoder 606 so that a 5.1-ch sound signal is outputted from the external output unit 609. A 2-ch sound signal may be outputted from the HDMI/CEC communication unit 604.

At that time, the value "1" indicating a theater mode is being set in the mode flag 610 in the memory 601. Further, in the amplifier 2, the sound signal inputted from the set-top box 6 to the external signal input unit 205 is outputted to the speaker output unit 206 by the microcomputer 202, so that sound is outputted from the external speaker 3 connected to the amplifier 2. Further, the output sound from the internal speaker 108 of the television set 1 is muted by the microcomputer 103. At that time, the value "1" indicating a theater mode is being set in the mode flag 110 in the memory 101.

The video signal and the sound signal outputted from the HDMI/CEC communication unit 604 of the set-top box 6 is inputted through the amplifier 2 to the HDMI/CEC communication unit 104 of the television set 1, and then decoded by the decoder 106. As a result, the display 107 displays the video, whereas the sound is muted and hence not outputted from the internal speaker 108.

In general, a broadcasting signal that can be received by the tuner 105 of the television set 1 is continued in a broadcasting signal of the cable television. Thus, in the system shown in FIG. 10, the tuner 105 is not used. Accordingly, the television set 1 need not output a sound signal to the amplifier 2, and hence nothing is connected to the external output unit 109. The television set 1 always displays the HDMI input. Thus, the input signal to the decoder 106 is always the signal from the HDMI/CEC communication unit 104.

(Mode Switching in Broadcast Program Viewing and Listening Using a Set-Top Box: 1)

When a user presses the menu button of the remote controller of the set-top box 6, the menu shown in FIG. 12 is generated by the microcomputer 603, and then displayed on the display 107 of the television set 1 via the HDMI cable. When the GUI button "mode switching" is selected, the microcomputer 603 refers to the mode flag 610 and then switches the mode into one different from the mode presently set up in the mode flag 610.

That is, when the value held in the mode flag 610 is "0" so that the sound output mode is a television mode, the microcomputer 603 sets the value of the mode flag 610 to be the value "1" of a theater mode. When the sound signal is not being outputted to the external output unit 609, a 5.1-ch sound signal is outputted to the external output unit 609. The microcomputer 603 may stop the output of the 2-ch sound signal to the HDMI/CEC communication unit 604.

Further, the microcomputer 603 notifies through the HDMI/CEC communication unit 604 to each device a CEC command indicating that the sound output mode of the set-top box 6 is a theater mode. When receiving this notification, the television set 1 sets the value of the mode flag 110 to be the value "1" of a theater mode and thereby instructs the decoder 106 to mute the output sound from the internal speaker 108. Thus, the decoder 106 mutes the output sound from the internal speaker 108. When the HDMI/CEC communication unit 201 of the amplifier 2 receives the CEC command, the microcomputer 202 instructs the selector 204 to output to the speaker output unit 206 the sound signal inputted through the external signal input unit 205. As a result, the selector 204 cancels the mute state of the speaker output unit 206, so that the sound based on the sound signal from the set-top box 6 is outputted from the external speaker 3.

Here, with taking into consideration the case that the amplifier 2 is in a power OFF (standby) state, it is preferable that the microcomputer 603 of the set-top box 6 first issues to the amplifier 2 a CEC command instructing a startup, and then on completion of the startup of the amplifier 2, performs the above-mentioned mode switching processing.

On the other hand, when the value held in the mode flag 610 is "1" so that the sound output mode is a theater mode, the microcomputer 603 sets the value of the mode flag 610 to be the value "0" of a television mode. When the sound signal is not being outputted to the HDMI/CEC communication unit 604, a 2-ch sound signal is outputted to the HDMI/CEC communication unit 604. The microcomputer 603 may stop the sound signal output from the external output unit 609.

Further, the microcomputer 603 notifies through the HDMI/CEC communication unit 604 to each device a CEC command indicating that the sound output mode of the set-top box 6 is a television mode. When receiving this notification, the microcomputer 103 of the television set 1 instructs the decoder 106 to cancel the mute state of the internal speaker 108. Thus, the decoder 106 cancels the mute state of the internal speaker 108. When the HDMI/CEC communication unit 201 of the amplifier 2 receives the CEC command, the microcomputer 202 instructs the selector 204 to mute the output sound from the speaker output unit 206. As a result, the selector 204 mutes the output sound from the speaker output unit 206, so that the sound based on the sound signal from the set-top box 6 is not outputted from the external speaker 3. Further, after that, the amplifier 2 may be brought into a power OFF (standby) state.

As described above, a mode notification is received by means of a CEC command so that each device operates appropriately in accordance with the mode. This allows a user to achieve linkage operation of the television set 1, the amplifier 2 and the set-top box 6 merely by operating a single remote controller. This improves usage easiness.

Here, it is assumed that not only the value of the mode flag 610 on the set-top box 6 side is changed but that the value of the mode flag 110 on the television set 1 side is also changed. However, the second embodiment of the invention is not limited to this. That is, even in a case that the value of any one of the mode flag 610 on the set-top box 6 side or the mode flag 110 on the television set 1 side is solely changed, when the mode is switched, the device that manages the mode may notify to the other devices that the mode has been switched. Then, similar effects are obtained. Here, in a case that not only the value of the mode flag 610 on the set-top box 6 side is changed but the value of the mode flag 110 on the television set 1 side is also changed, even when the television set 1 is solely turned ON after all the devices have been turned OFF, an effect is obtained that the television set 1 can operate in the mode at the instance of power OFF.

Here, the sound volume adjustment button of the remote controller of the set-top box 6 effectively acts on the television set 1. Thus, similarly to the case that the remote controller of the television set 1 is used, the remote controller of the set-top box 6 can adjust the sound volume of the internal speaker 108 of the television set 1 in a television mode, and adjust the sound volume of the external speaker 3 connected to the amplifier 2 in a theater mode.

Embodiment 3

(Example of Use of a Set-Top Box: 2)

Another embodiment of use of a set-top box is described below. Here, detailed description is omitted for the part similar to that of the second embodiment.

A television set according to the third embodiment has two input terminals for HDMI cables. Further, the set-top box according to the third embodiment includes an HDMI output unit connected to an HDMI cable and an optical output unit connected to an optical cable. Further, the set-top box has a dedicated remote controller. Using this remote controller, a user can perform channel switching, menu displaying and menu operation. The remote controller has a sound volume control button for the television set. Using the remote controller of the set-top box, a user can control the sound volume of the television set.

Figure 13:
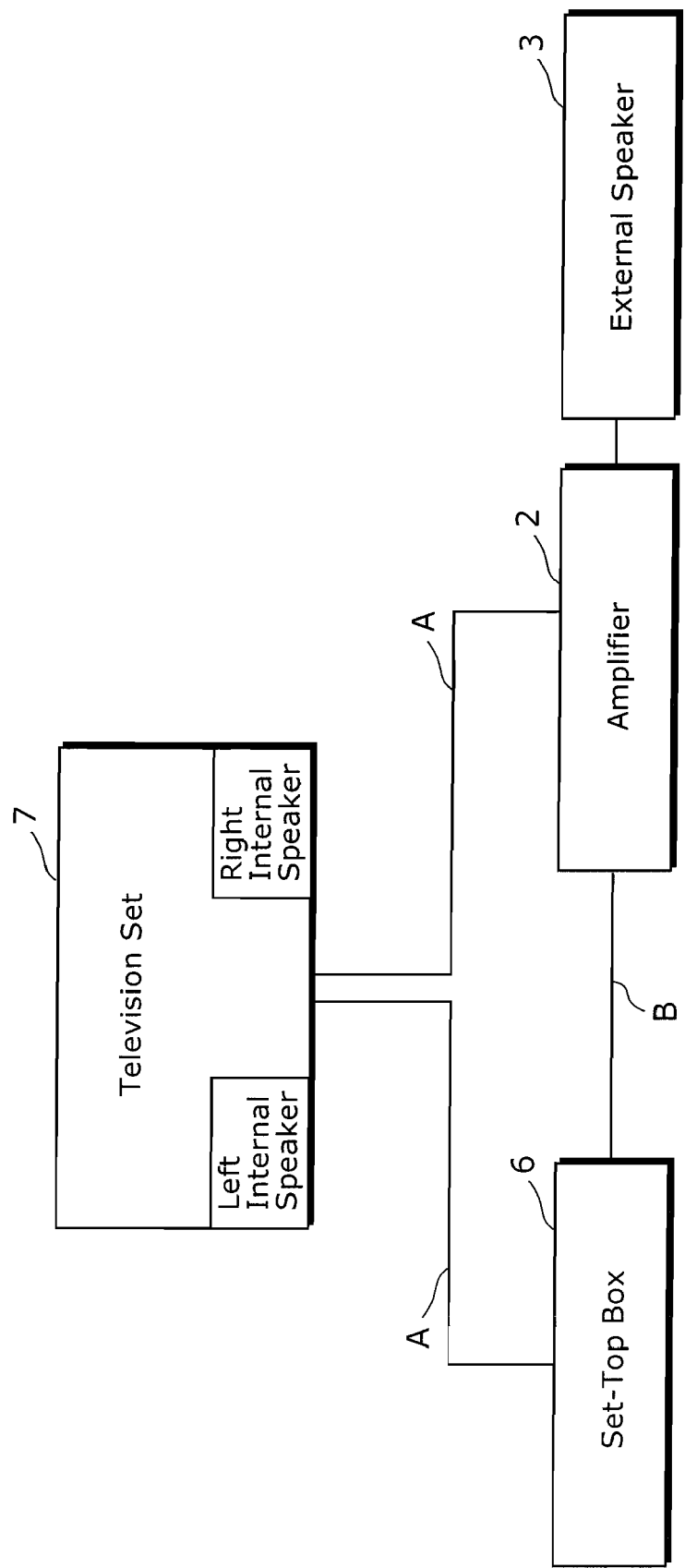
FIG. 13 is a diagram showing a configuration of a system including a set-top box according to the third embodiment.

FIG. 13 is a diagram showing a configuration of a system according to the third embodiment that includes a set-top box.

Among the two HDMI input terminals provided in the television set 7, one is connected to the set-top box 6 so that the video signal and the sound signal outputted from the set-top box 6 are inputted to the television set 7. The other HDMI input terminal of the television set 7 is connected to the amplifier 2.

The amplifier 2 and the set-top box 6 are interconnected also through an optical cable B so that the set-top box 6 can output a sound signal to the amplifier 2.

The television set 7, the amplifier 2 and the set-top box 6 can communicate CEC commands to each other via the CEC lines of the HDMI cables A.

Figure 14:
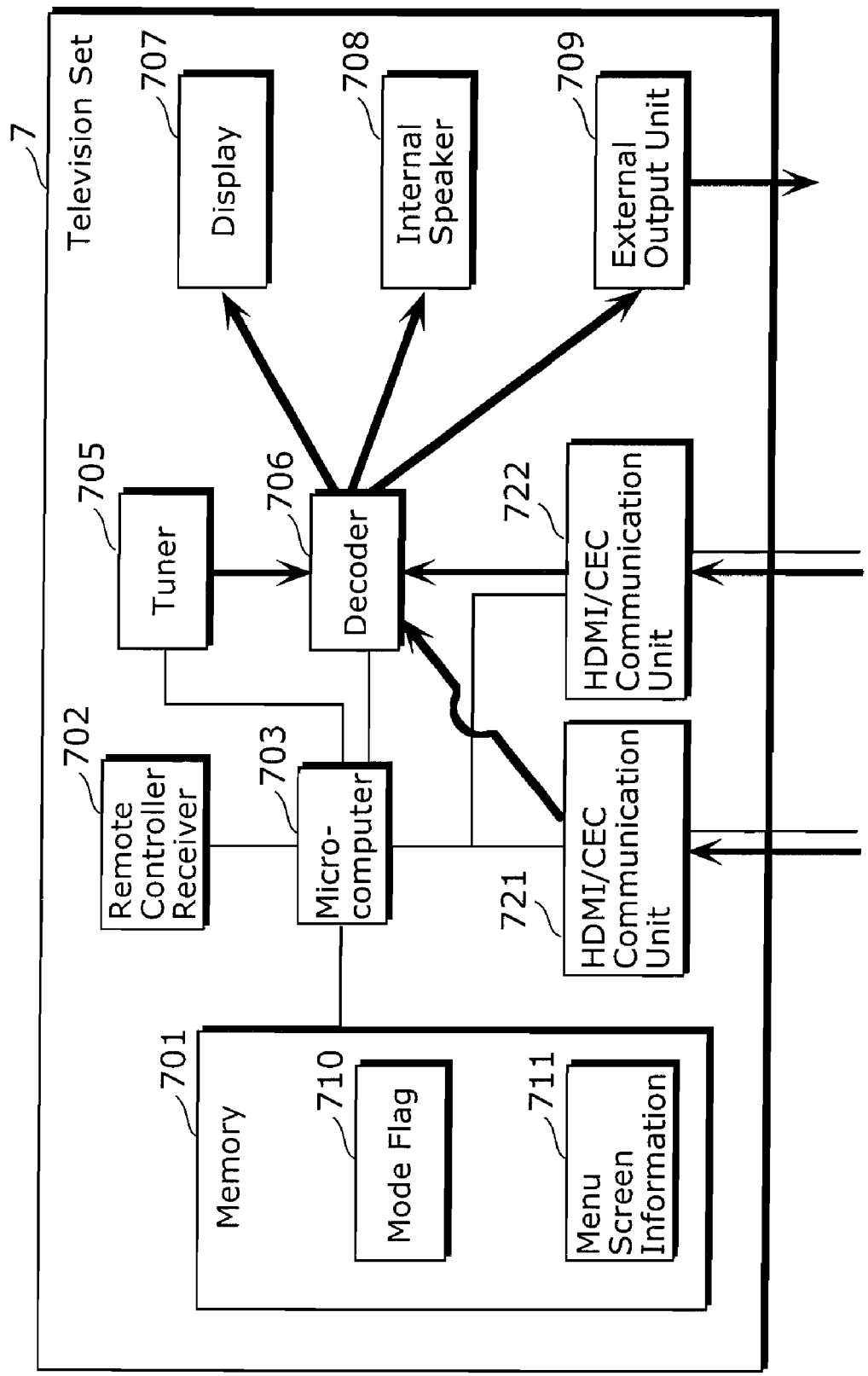
FIG. 14 is a block diagram showing a configuration of a television set according to the third embodiment.

FIG. 14 is a block diagram showing a configuration of the television set 7. The television set 7 includes a memory 701, a remote controller receiver 702, a microcomputer 703, an HDMI/CEC communication unit 721, an HDMI/CEC communication unit 722, a tuner 705, a decoder 706, a display 707, an internal speaker 708 and an external output unit 709. The memory 701 stores a mode flag 710 and menu screen information 711.

When the remote controller receiver 702 receives a command from a remote controller (not shown) of the television set 7, the microcomputer 703 performs processing in accordance with the received command. For example, the microcomputer 703 performs the switching of channel selection in the tuner 705 and the switching of data input to the decoder 706 and data output from the decoder 706. In response to the instruction of the microcomputer 703, the decoder 706 outputs to the display 707 the video signal inputted from the tuner 705, the HDMI/CEC communication unit 721 or the HDMI/CEC communication unit 722, and outputs to the internal speaker 708 or the external output unit 709 the sound signal inputted from the tuner 705, the HDMI/CEC communication unit 721 or the HDMI/CEC communication unit 722.

In the above-mentioned case, the tuner 705, the external output unit 709, and the menu screen information 711 have been described as components of a general television set. However, the television set according to the third embodiment may be a television set that does not include these elements.

The configuration of the amplifier 2 is as shown in FIG. 4, while the configuration of the set-top box 6 is as shown in FIG. 11.

The HDMI/CEC communication unit 604 of the set-top box 6 shown in FIG. 9 is connected through an HDMI cable A to the HDMI/CEC communication unit 721 of the television set 7 shown in FIG. 14. Further, the external output unit 609 shown in FIG. 11 is connected through an optical cable B to the external signal input unit 205 of the amplifier 2 shown in FIG. 4. Further, the HDMI/CEC communication unit 201 of the amplifier 2 shown in FIG. 4 is connected through an HDMI cable A to the HDMI/CEC communication unit 722 of the television set 7 shown in FIG. 14. Further, the external speaker 3 shown in FIG. 13 is connected through a speaker cable to the speaker output unit 206 of the amplifier 2 shown in FIG. 4.

Here, in FIGS. 4, 11 and 14, for the simplicity of understanding, the connection part implemented by the HDMI cable is indicated by two lines consisting of a line with an arrow and a line without an arrow. The line with an arrow indicates the path and the direction of the flow of a signal containing a video signal and a sound signal. The line without an arrow indicates the path of the flow of a CEC signal. The CEC signal flows bidirectionally. In an actual HDMI cable, these lines are bundled and accommodated in a single tube, and hence has the appearance of a single cable.

The menu screen of the set-top box 6 is as shown in FIG. 12.

(Broadcast Program Viewing and Listening Using a Set-Top Box: 2)

A case is described that in a television mode, a user views and listens to a broadcast program received by the set-top box 6.

In a television mode, in the set-top box 6, the video signal received through the tuner 605 is outputted from the HDMI/CEC communication unit 604 via the decoder 606. The sound signal received through the tuner 605 is outputted from the HDMI/CEC communication unit 604 via the decoder 606. The sound signal may be outputted from the external output unit 609.

At that time, the value "0" indicating a television mode is being set in the mode flag 610 in the memory 601. Further, the amplifier 2 is in a power OFF (standby) state, or alternatively the output sound from the speaker output unit 206 is muted by the microcomputer 202, so that sound is not outputted from the external speaker 3 connected to the amplifier 2. Further, the value "0" indicating a television mode is being set in the mode flag 710 in the memory 701 of the television set 7.

The video signal and the sound signal outputted from the HDMI/CEC communication unit 604 of the set-top box 6 is inputted to the HDMI/CEC communication unit 721 of the television set 7, and then decoded by the decoder 706. As a result, the display 707 displays the video, while the internal speaker 708 outputs the sound.

In a theater mode, in the set-top box 6, the video signal received through the tuner 605 is outputted from the HDMI/CEC communication unit 604 via the decoder 606. The sound signal received through the tuner 605 is outputted from the external output unit 609 via the decoder 606. The sound signal may be outputted from the HDMI/CEC communication unit 604.

At that time, the value "1" indicating a theater mode is being set in the mode flag 610 in the memory 601. Further, in the amplifier 2, the sound signal inputted from the set-top box 6 to the external signal input unit 205 is outputted to the speaker output unit 206 by the microcomputer 202, so that sound is outputted from the external speaker 3 connected to the amplifier 2. Further, the output sound from the internal speaker 708 of the television set 7 is muted by the microcomputer 703. At that time, the value "1" indicating a theater mode is being set in the mode flag 710 in the memory 701.

The video signal and the sound signal outputted from the HDMI/CEC communication unit 604 of the set-top box 6 is inputted to the HDMI/CEC communication unit 721 of the television set 7, and then decoded by the decoder 706. As a result, the display 707 displays the video, whereas the sound is muted and hence not outputted from the internal speaker 708.

In general, a broadcasting signal that can be received by the tuner 705 of the television set 7 is continued in a broadcasting signal of the cable television. Thus, in the system shown in FIG. 13, the tuner 705 is not used. Accordingly, the television set 7 need not output a sound signal to the amplifier 2, and hence nothing is connected to the external output unit 709. The television set 7 always displays the HDMI input. Thus, the input signal to the decoder 706 is always the signal from the HDMI/CEC communication unit 721.

(Mode Switching in Broadcast Program Viewing and Listening Using a Set-Top Box: 2)

When a user presses the menu button of the remote controller of the set-top box 6, the menu shown in FIG. 12 is generated by the microcomputer 603, and then displayed on the display 707 of the television set 7 via the HDMI cable. When the GUI button "mode switching" is selected, the microcomputer 603 refers to the mode flag 610 and then switches the mode into one different from the mode presently set up in the mode flag 610.

That is, when the value held in the mode flag 610 is "0" so that the sound output mode is a television mode, the microcomputer 603 sets the value of the mode flag 610 to be the value "1" of a theater mode. When the sound signal is not being outputted to the external output unit 609, a sound signal is outputted to the external output unit 609. The microcomputer 603 may stop the output of the sound signal to the HDMI/CEC communication unit 604.

Further, the microcomputer 603 notifies through the HDMI/CEC communication unit 604 to each device a CEC command indicating that the sound output mode of the set-top box 6 is a theater mode. When receiving this notification, the microcomputer 703 of the television set 7 sets the value of the mode flag 710 to be the value "1" of a theater mode and thereby instructs the decoder 706 to mute the output sound from the internal speaker 708. Thus, the decoder 706 mutes the output sound from the internal speaker 708. When the HDMI/CEC communication unit 201 of the amplifier 2 receives the CEC command, the microcomputer 202 instructs the selector 204 to output to the speaker output unit 206 the sound signal inputted through the external signal input unit 205. As a result, the selector 204 cancels the mute state of the speaker output unit 206, so that the sound based on the sound signal from the set-top box 6 is outputted from the external speaker 3.

Here, with taking into consideration the case that the amplifier 2 is in a power OFF (standby) state, it is preferable that the microcomputer 603 of the set-top box 6 first issues to the amplifier 2 a CEC command instructing a startup, and then on completion of the startup of the amplifier 2, performs the above-mentioned mode switching processing.

On the other hand, when the value held in the mode flag 610 is "1" so that the sound output mode is a theater mode, the microcomputer 603 sets the value of the mode flag 610 to be the value "0" of a television mode. When the sound signal is not being outputted to the HDMI/CEC communication unit 604, a sound signal is outputted to the HDMI/CEC communication unit 604. The microcomputer 603 may stop the sound signal output from the external output unit 609.

(% Paragraph %):

Further, the microcomputer 603 notifies through the HDMI/CEC communication unit 604 to each device a CEC command indicating that the sound output mode of the set-top box 6 is a television mode. When receiving this notification, the microcomputer 703 of the television set 7 instructs the decoder 706 to cancel the mute state of the internal speaker 708. Thus, the decoder 706 cancels the mute state of the internal speaker 708. When the HDMI/CEC communication unit 201 of the amplifier 2 receives the CEC command, the microcomputer 202 instructs the selector 204 to mute the output sound from the speaker output unit 206. As a result, the selector 204 mutes the output sound from the speaker output unit 206, so that the sound based on the sound signal from the set-top box 6 is not outputted from the external speaker 3. Further, after that, the amplifier 2 may be brought into a power OFF (standby) state.

As described above, a mode notification is received by means of a CEC command so that each device operates appropriately in accordance with the mode. This allows a user to achieve linkage operation of the television set 7, the amplifier 2 and the set-top box 6 merely by operating a single remote controller. This improves usage easiness.

Here, the sound volume adjustment button of the remote controller of the set-top box 6 effectively acts on the television set 7. Thus, similarly to the case that the remote controller of the television set 7 is used, the remote controller of the set-top box 6 can adjust the sound volume of the internal speaker 708 of the television set 7 in a television mode, and adjust the sound volume of the external speaker 3 connected to the amplifier 2 in a theater mode.

Further, in the above-mentioned case, the amplifier 2 has been employed as a device (a so-called switcher) capable of selecting input and output signals. However, the amplifier 2 may be a device having both of a reproduction function and a switcher function. That is, in the first embodiment, the amplifier 2 and the player 4 may be integrated. Further, in the second and third embodiments, the amplifier 2 may be a device having a reproduction function.

Embodiment 4

Meanwhile, according to the technique disclosed in Patent Reference 1, when a user switches the power switch of the AV amplifier between an ON state and an OFF state, the system can be switched between a state that sound is outputted from the speaker (internal speaker) built in the television set and a state that sound is output from the speaker (external speaker) outside the television set.

Nevertheless, in some cases, the user desires that the system is switched between a state that sound is outputted from the internal speaker and a state that sound is output from the external speaker, merely by operating the remote controller of the AV amplifier or alternatively the main body of the AV amplifier in a state that the power switch of the AV amplifier is maintained in an ON state.

In the fourth embodiment, a technique is described that permits the switching between a state that sound is outputted from the internal speaker and a state that sound is output from the external speaker, regardless of the power state of the AV amplifier, The configuration of a system according to the fourth embodiment is similar to that of the above-mentioned first embodiment. That is, the configuration of the television set 1 according to the fourth embodiment is as shown in FIG. 3. The configuration of the amplifier 2 according to the fourth embodiment is as shown in FIG. 4. The configuration of the player 4 according to the fourth embodiment is as shown in FIG. 5.

Figure 15:
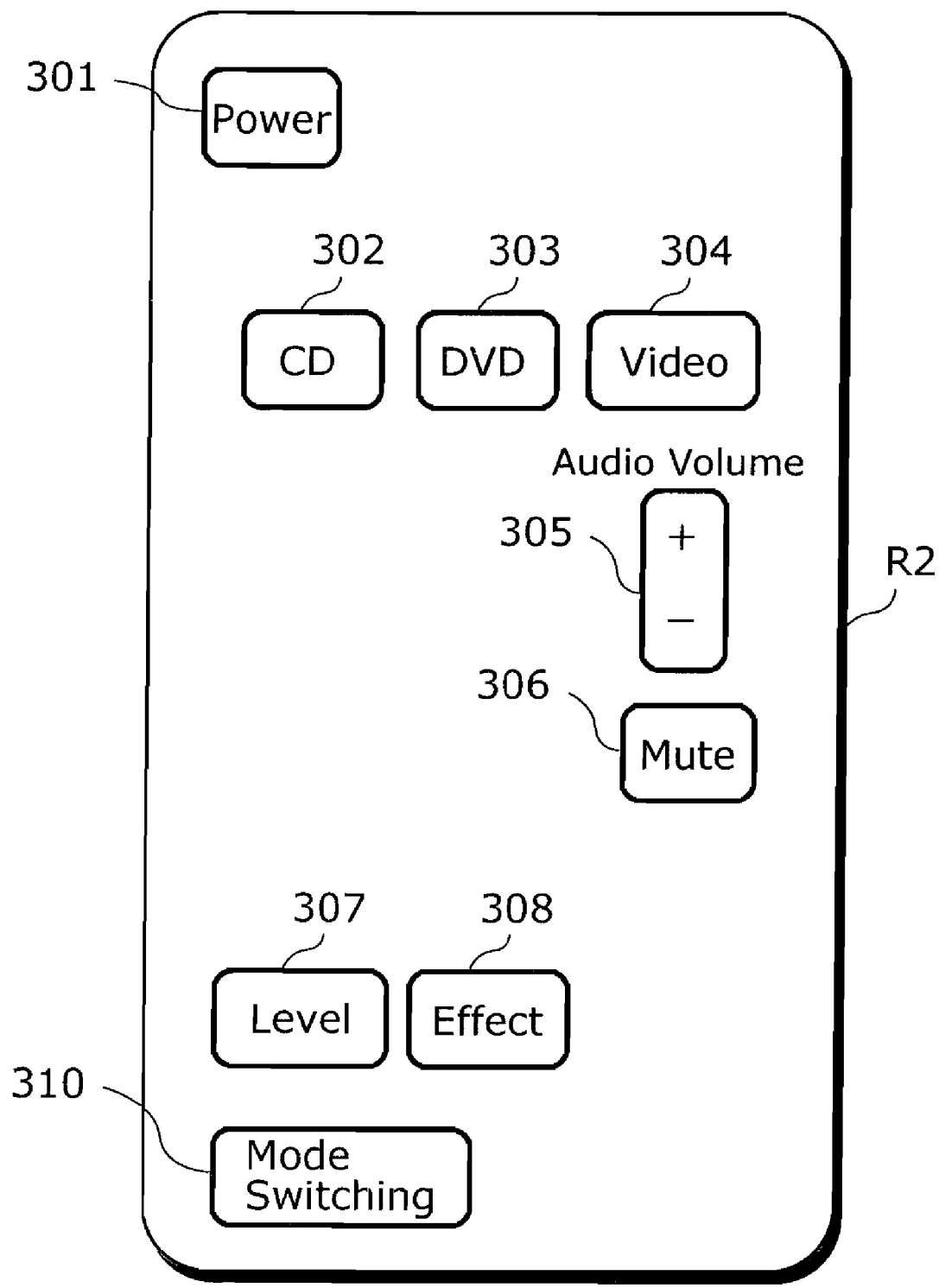
FIG. 15 is a diagram showing an external appearance of a remote controller of an amplifier according to the fourth embodiment.

FIG. 15 is a diagram showing an external appearance of a remote controller R2 of the amplifier 2 according to the fourth embodiment. The remote controller R2 of the amplifier 2 is a remote controller for operating the amplifier 2 by remote control, and is referred to as the "amplifier remote controller R2", hereinafter in some cases.

As shown in FIG. 15, the amplifier remote controller R2 has buttons for operating the amplifier 2 by remote control. That is, the amplifier remote controller R2 includes: a power button 301; a CD switching button 302, a DVD switching button 303 and a video switching button 304 for switching a device connected to the amplifier 2; a sound volume button 305 for adjusting the sound volume; a mute button 306 for muting and mute canceling; a level button 307 for setting the sound outputted from the external speaker 3 connected to the amplifier 2; an effect button 308; and a mode switching button 310. When pressing the mode switching button 310, a user can switch the mode between a television mode and a theater mode.

Below, a processing flow is described that the mode flag 110 stored in the memory 101 is switched from a television mode to a theater mode in a system including the television set 1, the amplifier 2, the external speaker 3 and the player 4.

When the mode flag 110 stored in the memory 101 indicates a television mode, the microcomputer 103 outputs to the display 107 the video signal received through the tuner 105, and outputs to the internal speaker 108 and the external output unit 109 the sound signal received through the tuner 105. Thus, sound is outputted from the internal speaker 108 of the television set 1.

Further, the amplifier 2 mutes the sound signal that is inputted from the external signal input unit 205 connected to the external output unit 109 of the television set 1 and that is to be outputted to the speaker output unit 206. Thus, sound is not outputted from the external speaker 3 connected to the amplifier 2.

In this state, when a user presses the mode switching button 310 shown in FIG. 15 by using the amplifier remote controller R2, the amplifier remote controller R2 transmits to the television set 1 a signal requiring the switching of the contents of the mode flag 110 stored in the memory 101. The remote controller receiver 102 of the television set 1 receives the signal outputted from the amplifier remote controller R2. The microcomputer 103 of the television set 1 analyzes the received signal, and then changes the mode flag 110 recorded in the memory 101. That is, the microcomputer 103 changes the mode flag 110 recorded in the memory 101, from a television mode to a theater mode.

Then, the microcomputer 103 instructs the decoder 106 to mute the sound from the internal speaker 108. When instructed by the microcomputer 103 such as to mute the sound from the internal speaker 108, the decoder 106 mutes the sound from the internal speaker 108. Thus, sound is not outputted from the internal speaker 108 of the television set 1.

Further, the microcomputer 103 transmits through the HDMI/CEC communication unit 104 to the amplifier 2 a CEC command indicating that the mode flag 110 recorded in the memory 101 of the television set 1 has been changed from a television mode to a theater mode.

When the HDMI/CEC communication unit 201 of the amplifier 2 receives a CEC command from the HDMI/CEC communication unit 104 of the television set 1, the microcomputer 202 analyzes the CEC command received through the HDMI/CEC communication unit 201. This CEC command is a command indicating that the mode flag 110 recorded in the memory 101 of the television set 1 has been changed from a television mode to a theater mode. Thus, the microcomputer 202 instructs the selector 204 to output to the speaker output unit 206 the sound signal inputted from the external signal input unit 205.

When instructed by the microcomputer 202 such as to output to the speaker output unit 206 the sound signal inputted from the external signal input unit 205, the selector 204 outputs the sound signal to the speaker output unit 206. Thus, the sound is outputted from the external speaker 3.

Next, a processing flow is described that the mode flag 110 stored in the memory 101 is switched from a theater mode to a television mode in a system including the television set 1, the amplifier 2, the external speaker 3 and the player 4.

When the mode flag 110 stored in the memory 101 indicates a theater mode, the microcomputer 103 outputs to the display 107 the video signal received through the tuner 105, and outputs not to the internal speaker 108 but to the external output unit 109 the sound signal received through the tuner 105. Thus, sound is not outputted from the internal speaker 108 of the television set 1.

Further, the amplifier 2 outputs the sound signal that is inputted from the external signal input unit 205 connected to the external output unit 109 of the television set 1 and that is to be outputted to the speaker output unit 206. Thus, sound is outputted from the external speaker 3 connected to the amplifier 2.

In this state, when a user presses the mode switching button 310 shown in FIG. 15 by using the amplifier remote controller R2, the amplifier remote controller R2 transmits to the television set 1 a signal requiring the switching of the contents of the mode flag 110 stored in the memory 101. The remote controller receiver 102 of the television set 1 receives the signal outputted from the amplifier remote controller R2. The microcomputer 103 of the television set 1 analyzes the received signal, and then changes the mode flag 110 recorded in the memory 101. That is, the microcomputer 103 changes the mode flag 110 recorded in the memory 101, from a theater mode to a television mode.

Then, the microcomputer 103 instructs the decoder 106 such that sound should be outputted from the internal speaker 108 that is not outputting sound. When instructed by the microcomputer 103 such that sound should be outputted from the internal speaker 108, the decoder 106 causes the internal speaker 108 to output sound. Thus, sound is outputted from the internal speaker 108 of the television set 1.

Further, the microcomputer 103 transmits through the HDMI/CEC communication unit 104 to the amplifier 2 a CEC command indicating that the mode flag 110 recorded in the memory 101 of the television set 1 has been changed from a television mode to a theater mode.

When the HDMI/CEC communication unit 201 of the amplifier 2 receives a CEC command from the HDMI/CEC communication unit 104 of the television set 1, the microcomputer 202 analyzes the CEC command received through the HDMI/CEC communication unit 201. This CEC command is a command indicating that the mode flag 110 recorded in the memory 101 of the television set 1 has been changed from a theater mode to a television mode. Thus, the microcomputer 202 instructs the selector 204 not to output to the speaker output unit 206 the sound signal inputted from the external signal input unit 205.

When instructed by the microcomputer 202 such as not to output to the speaker output unit 206 the sound signal inputted from the external signal input unit 205, the selector 204 does not output the sound signal to the speaker output unit 206. Thus, the sound is not outputted from the external speaker 3.

Here, the mode switching button 310 capable of changing the mode flag 110 stored in the television set 1 is provided in the amplifier remote controller R2. However, a button having a function equivalent to that of the mode switching button 310 may be provided on the main body of the amplifier 2, and then a user may operate the button. However, a button having a function equivalent to that of the mode switching button 310 may be provided on the main body of the player 4, and then a user may operate the button.

As described above, the fourth embodiment provides a video/sound output device and an external speaker control device that perform switching between a state that sound is outputted from an internal speaker and a state that sound is output from an external speaker, regardless of the power state of the external speaker control device for controlling the external speaker that is a speaker outside the video/sound output device.

Further, according to the fourth embodiment, a user can perform switching between a state that sound is outputted from an internal speaker and a state that sound is output from an external speaker, without operating the power of an external speaker control device. This simplifies the switching operation for the sound output state, and hence improves the user's usage easiness.

Embodiment 5

In the fifth embodiment, a technique for automatically turning ON and OFF the amplifier 2 is described below.

As described above, in a television mode, sound is outputted from the internal speaker 108 of the television set 1, whereas sound is not outputted from the external speaker 3 connected to the amplifier 2. In this case, the amplifier 2 is not used. Thus, if the amplifier 2 were maintained ON, electric power would be consumed uselessly. Thus, in the fifth embodiment, when the mode is switched from a theater mode to a television mode, the amplifier 2 is automatically turned OFF.

Figure 16:
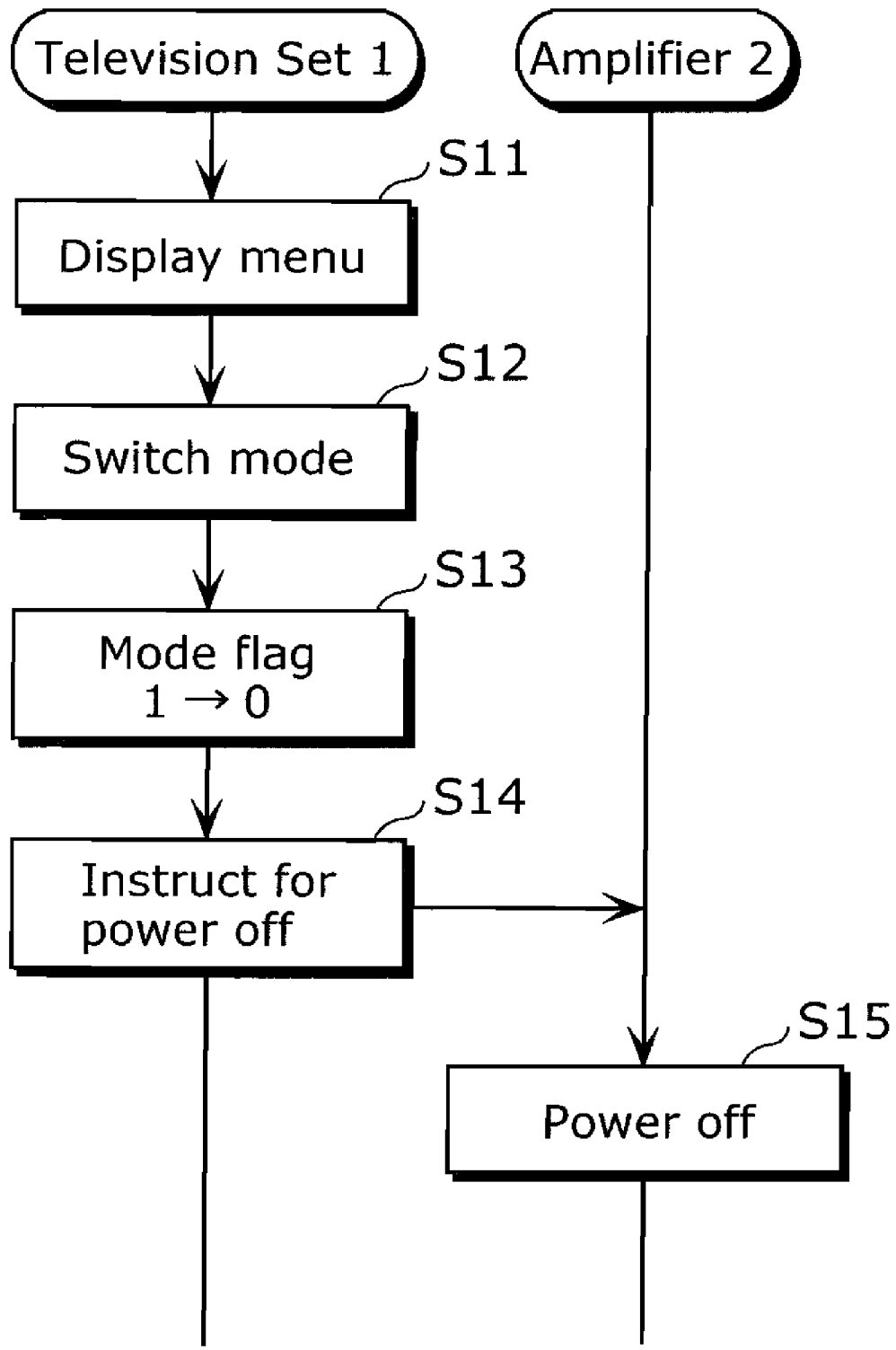
FIG. 16 is a flow chart showing operation of a television set and an amplifier according to the fifth embodiment.

FIG. 16 is a flow chart showing operation of a television set and an amplifier according to the fifth embodiment.

The following description is given with focusing attention on the points different from those of the first embodiment.

First, when the user presses the menu button of the remote controller of the television set 1, a menu including GUI buttons such as "mode switching" and "player reproduction" are displayed on the display 107 as shown in FIG. 6 (S11). Then, when the user selects the GUI button "mode switching", the microcomputer 103 of the television set 1 switches the mode (S12). Here, it is assumed that the mode is switched from a theater mode to a television mode.

In this case, the microcomputer 103 of the television set 1 changes the value of the mode flag 110 from the value "1" indicating a theater mode to the value "0" indicating a television mode (S13). Further, the microcomputer 103 of the television set 1 notifies through the HDMI/CEC communication unit 104 to the amplifier 2 a CEC command indicating that the power should be turned OFF (S14). When the CEC command is received by the HDMI/CEC communication unit 201 of the amplifier 2, the microcomputer 202 (the power control unit according to the fourth embodiment of the invention) of the amplifier 2 brings the amplifier 2 into a power OFF (standby) state (S15).

As described above, according to the fifth embodiment, when the mode is switched from a theater mode to a television mode, the amplifier 2 is automatically turned OFF. This avoids useless power consumption, and hence provides an economical system. Further, it is sufficient that the amplifier 2 can interpret the CEC command for controlling the power of the amplifier 2. That is, a special function exceeding it is unnecessary. This is an advantage.

Figure 17:
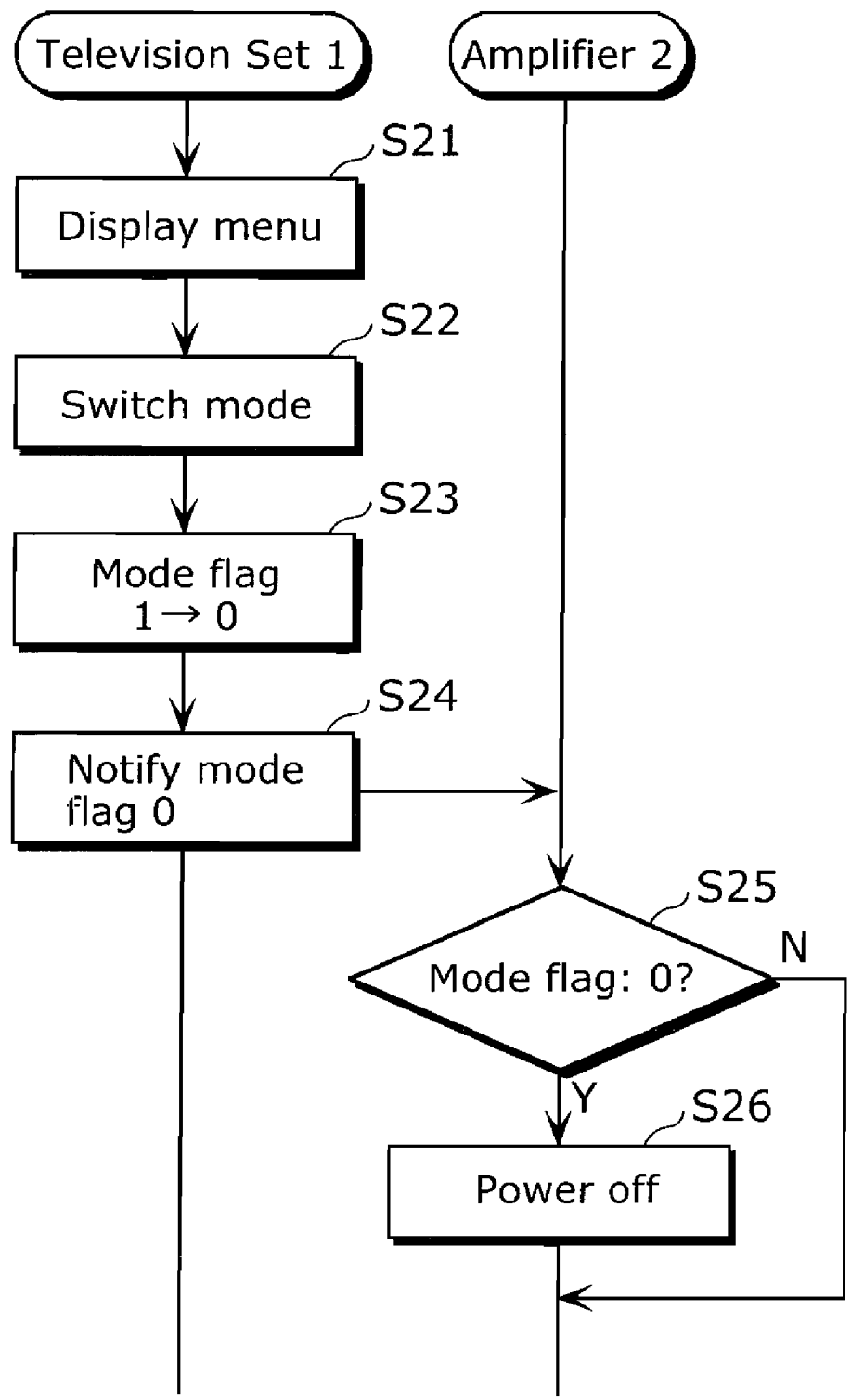
FIG. 17 is a flow chart showing operation of a television set and an amplifier according to the fifth embodiment.

FIG. 17 is a flow chart showing operation of a television set and an amplifier according to the fifth embodiment.

S21 through S23 in FIG. 17 are the same as S11 through S13 in FIG. 16. That is, when the user presses the menu button of the remote controller of the television set 1, a menu including GUI buttons such as "mode switching" and "player reproduction" are displayed on the display 107 as shown in FIG. 6 (S21). Then, when the user selects the GUI button "mode switching", the microcomputer 103 of the television set 1 switches the mode (S22). Here, it is assumed that the mode is switched from a theater mode to a television mode. In this case, the microcomputer 103 of the television set 1 changes the value of the mode flag 110 from the value "1" indicating a theater mode to the value "0" indicating a television mode (S23).

Here, the microcomputer 103 of the television set 1 notifies through the HDMI/CEC communication unit 104 to the amplifier 2 a CEC command indicating that the mode has been changed from a theater mode to a television mode (S24). The method of indicating that the mode has been changed from a theater mode to a television mode is not limited to a particular one. In this example, it is assumed that the value of the changed mode flag 110 is contained in the CEC command.

When the CEC command is received by the HDMI/CEC communication unit 201 of the amplifier 2, the microcomputer 202 of the amplifier 2 determines whether or not the value of the mode flag 110 contained in the CEC command is "0" (S25). Then, when the value of the mode flag 110 is "0", it is concluded that the mode has been changed from a theater mode to a television mode. Thus, the amplifier 2 is brought into a power OFF (standby) state (S26).

As described above, according to the fifth embodiment, when the mode is switched from a theater mode to a television mode, the amplifier 2 is automatically turned OFF. This avoids useless power consumption, and hence provides an economical system. Further, it is sufficient that the television set 1 has the function of notifying the value of the mode flag 110 to the amplifier 2. That is, a special function for controlling the power of the amplifier 2 is unnecessary. This is an advantage.

Meanwhile, in a theater mode, sound is not outputted from the internal speaker 108 of the television set 1, whereas sound is outputted from the external speaker 3 connected to the amplifier 2. That is, the amplifier 2 is used so that the amplifier 2 need be being ON. Thus, in the fifth embodiment, when the mode is switched from a television mode to a theater mode, the amplifier 2 is automatically turned ON.

Figure 18:
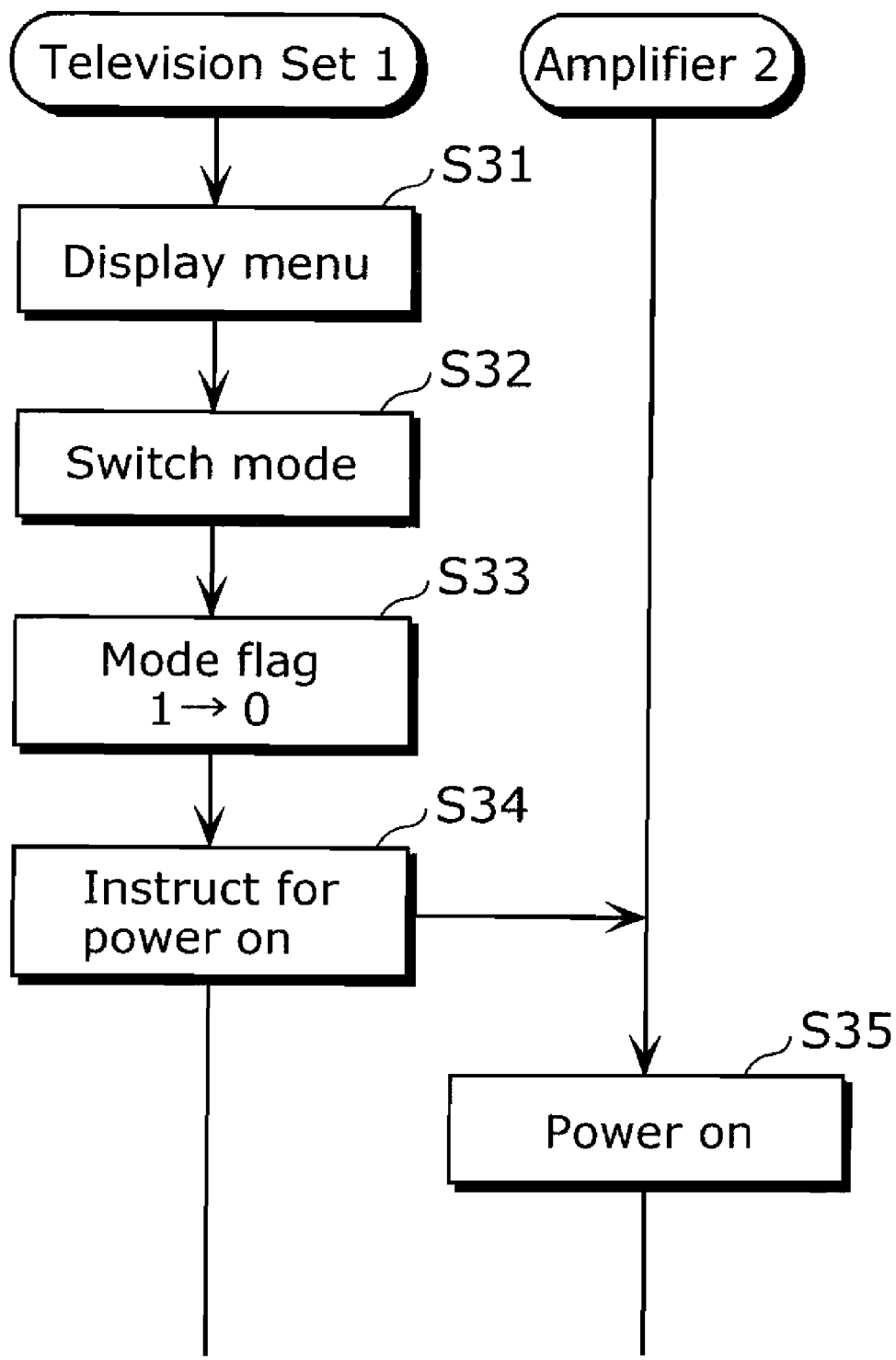
FIG. 18 is a flow chart showing operation of a television set and an amplifier according to the fifth embodiment.

FIG. 18 is a flow chart showing operation of a television set and an amplifier according to the fifth embodiment.

First, when the user presses the menu button of the remote controller of the television set 1, a menu including GUI buttons such as "mode switching" and "player reproduction" are displayed on the display 107 as shown in FIG. 6 (S31). Then, when the user selects the GUI button "mode switching", the microcomputer 103 of the television set 1 switches the mode (S32). Here, it is assumed that the mode is switched from a television mode to a theater mode.

In this case, the microcomputer 103 of the television set 1 changes the value of the mode flag 110 from the value "0" indicating a television mode to the value "1" indicating a theater mode (S33). Further, the microcomputer 103 of the television set 1 notifies through the HDMI/CEC communication unit 104 to the amplifier 2 a CEC command indicating that the power should be turned ON (S34). When the CEC command is received by the HDMI/CEC communication unit 201 of the amplifier 2, the microcomputer 202 of the amplifier 2 brings the amplifier 2 into a power ON state (S35).

As described above, according to the fifth embodiment, when the mode is switched from a television mode to a theater mode, the amplifier 2 is automatically turned ON. This avoids useless power consumption, and hence provides an economical system. Further, it is sufficient that the amplifier 2 can interpret the CEC command for controlling the power of the amplifier 2. That is, a special function exceeding it is unnecessary. This is an advantage.

Figure 19:
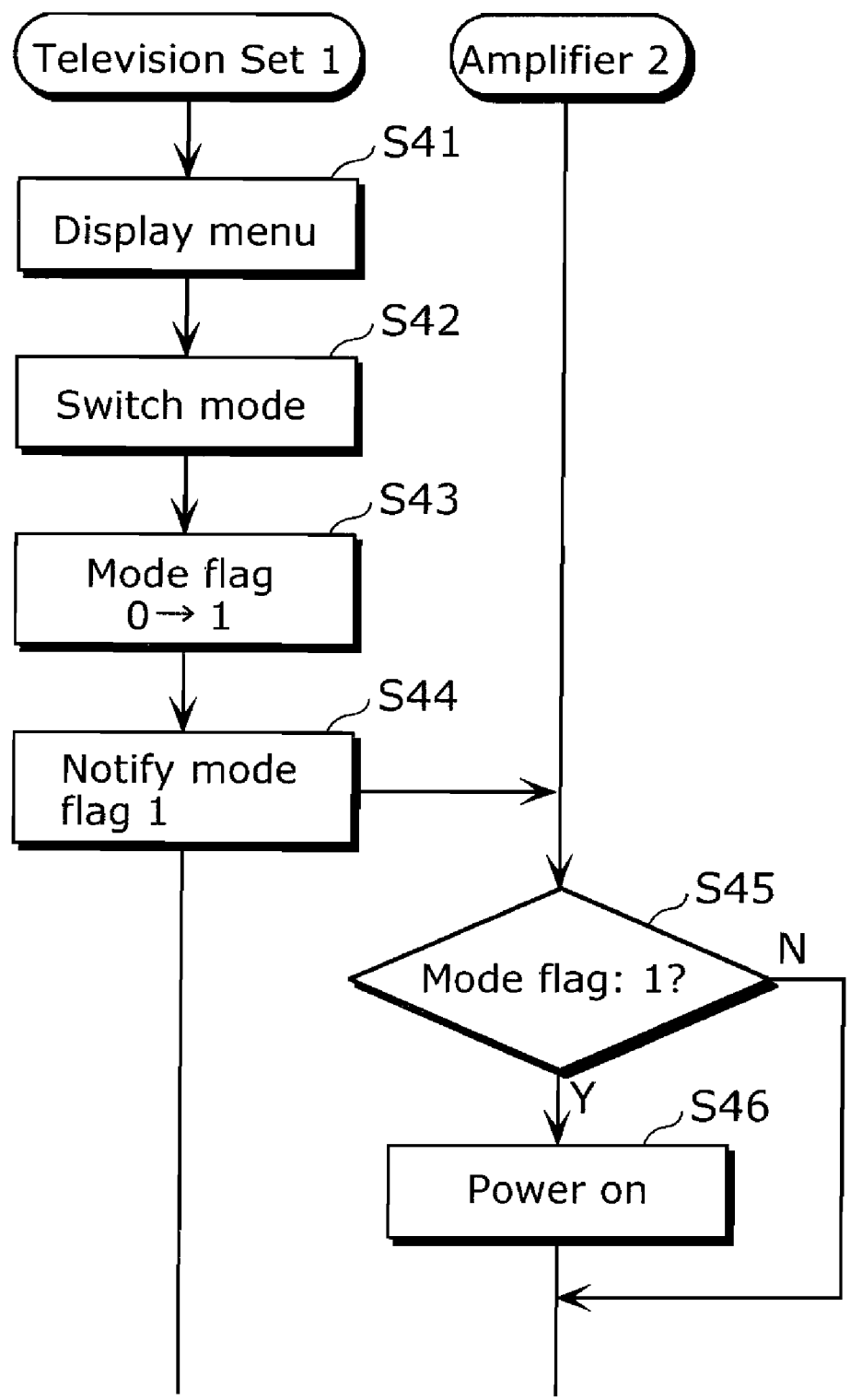
FIG. 19 is a flow chart showing operation of a television set and an amplifier according to the fifth embodiment.

FIG. 19 is a flow chart showing operation of a television set and an amplifier according to the fifth embodiment.

S41 through S43 in FIG. 19 are the same as S31 through S33 in FIG. 18. That is, when the user presses the menu button of the remote controller of the television set 1, a menu including GUI buttons such as "mode switching" and "player reproduction" are displayed on the display 107 as shown in FIG. 6 (S41). Then, when the user selects the GUI button "mode switching", the microcomputer 103 of the television set 1 switches the mode (S42). Here, it is assumed that the mode is switched from a television mode to a theater mode. In this case, the microcomputer 103 of the television set 1 changes the value of the mode flag 110 from the value "0" indicating a television mode to the value "1" indicating a theater mode (S43).

Here, the microcomputer 103 of the television set 1 notifies through the HDMI/CEC communication unit 104 to the amplifier 2 a CEC command indicating that the mode has been changed from a television mode to a theater mode (S44). The method of indicating that the mode has been changed from a television mode to a theater mode is not limited to a particular one. In this example, it is assumed that the value of the changed mode flag 110 is contained in the CEC command.

When the CEC command is received by the HDMI/CEC communication unit 201 of the amplifier 2, the microcomputer 202 of the amplifier 2 determines whether or not the value of the mode flag 110 contained in the CEC command is "1" (S45). Then, when the value of the mode flag 110 is "1", it is concluded that the mode has been changed from a television mode to a theater mode. Thus, the amplifier 2 is brought into a power ON state (S46).

As described above, according to the fifth embodiment, when the mode is switched from a television mode to a theater mode, the amplifier 2 is automatically turned ON. This avoids useless power consumption, and hence provides an economical system. Further, it is sufficient that the television set 1 has the function of notifying the value of the mode flag 110 to the amplifier 2. That is, a special function for controlling the power of the amplifier 2 is unnecessary. This is an advantage.

Here, after performing the mode switching processing, the microcomputer 103 of the television set 1 notifies to the amplifier 2 the CEC command indicating that the power should be turned ON (S33→S34 in FIG. 18 and S43→S44 of FIG. 19). However, the fourth embodiment of the invention is not limited to this. That is, with taking into consideration the case that the amplifier 2 is in a power OFF (standby) state, it is preferable that the microcomputer 103 of the television set 1 first notifies to the amplifier 2 a CEC command indicating that the power should be turned ON, and then on completion of the startup of the amplifier 2, performs the mode switching processing (S33 in FIG. 18 and S43 in FIG. 19). The timing of performing this mode switching processing is described below in further detail.

Figure 20:
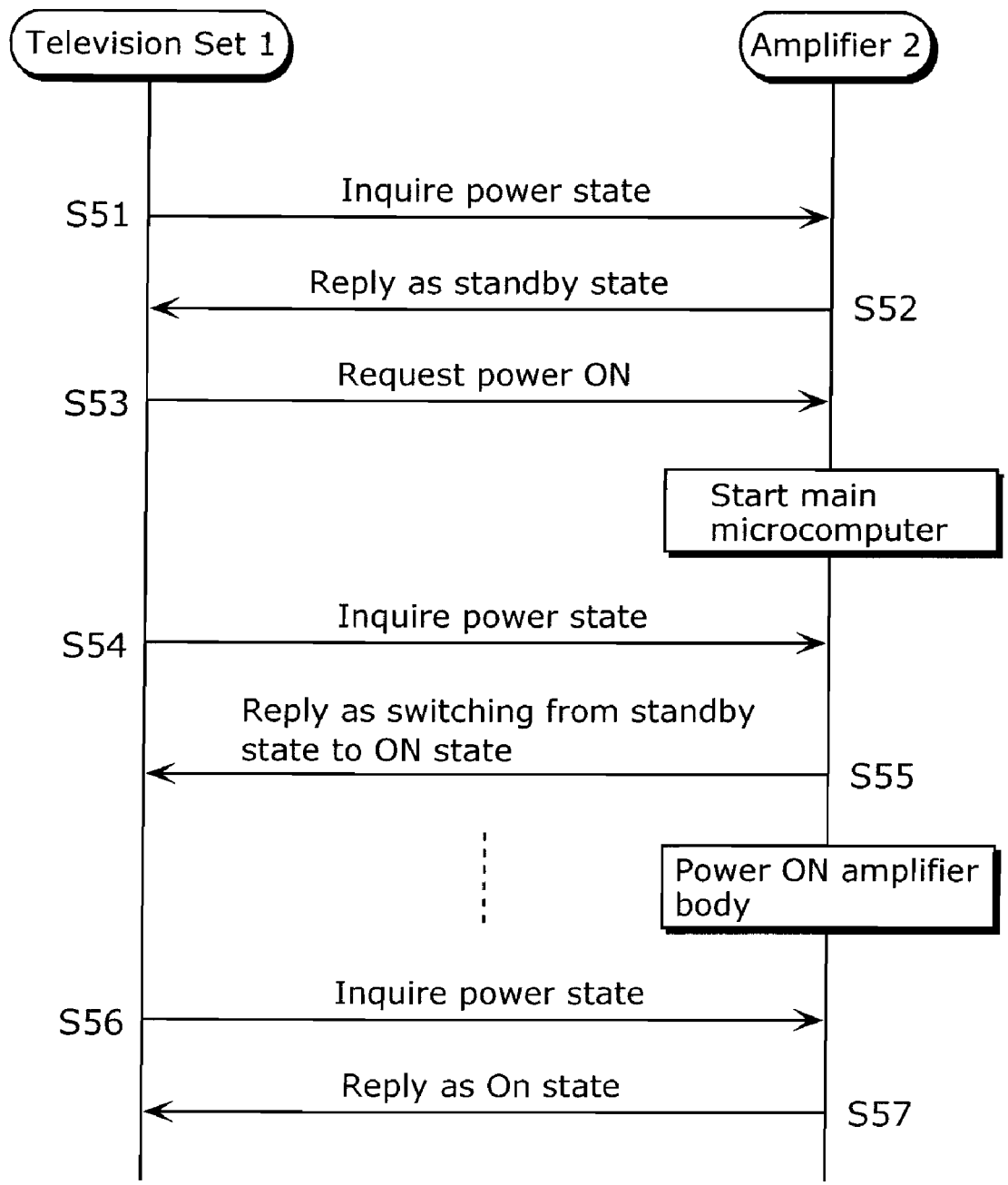
FIG. 20 is a flow chart showing a procedure that a television set turns ON an amplifier according to the fifth embodiment.

FIG. 20 is a flow chart showing a procedure in which the television set turns ON the amplifier.

First, the television set 1 notifies to the amplifier 2 a CEC command for inquiring the power state (S51). When receiving this CEC command, the amplifier 2 replies a standby state to the television set 1 (S52). Then, the television set 1 notifies to the amplifier 2 a CEC command indicating that the power should be turned ON (S53). When receiving this CEC command, the amplifier 2 starts up the microcomputer 202. Then, the television set 1 notifies to the amplifier 2 a CEC command for inquiring the power state (S54). When receiving this CEC command, the amplifier 2 replies to the television set 1 a transition from a standby state to an ON state (S55).

Similar inquiry processing is repeated hereinafter. Then, after the amplifier 2 main body goes ON, the television set 1 notifies to the amplifier 2 a CEC command for inquiring the power state (S56). When receiving this CEC command, the amplifier 2 replies an ON state to the television set 1 (S57). When receiving this reply, the television set 1 performs mode switching processing (S33 in FIG. 18 and S43 in FIG. 19).

If the internal speaker 108 of the television set 1 were muted before the completion of startup of the amplifier 2, a problem could arise that sound would not be outputted from the internal speaker 108 and the external speaker 3. However, according to the fourth embodiment of the invention, mode switching processing is performed after the checking of power ON of the amplifier 2 as described above. This avoids the above-mentioned problem.

The video/sound output device according to the invention is useful as a television set, a set-top box or the like. The external speaker control device according to the invention is useful as an AV amplifier or the like. The sound signal output device according to the invention is useful as a recorder, a player or the like.

The invention claimed is:

1. A video and sound output device which outputs video and sound, the video and sound output device comprising:
   an internal speaker operable to output sound;
   a holding unit operable to hold information which indicates a sound output mode;
   a receiving unit operable to receive a mode specifying instruction for specifying a sound output mode;
   a management unit operable to cause, based on the mode specifying instruction received by the receiving unit, the holding unit to hold one of:
   (a) information indicating a first sound output mode in which sound is outputted from the internal speaker, or
   (b) information indicating a second sound output mode in which sound is outputted from an external speaker outside the video and sound output device; and
   an output unit operable to output the information indicating the sound output mode held in the holding unit, to an external speaker control device which controls the external speaker,
   wherein the output unit is operable to output information to the external speaker control device such that: (a) when the information indicating the first sound output mode is received, the sound is not outputted from the external speaker; and (b) when the information indicating the second sound output mode is received, the sound is outputted from the external speaker, and
   the video and sound output device further comprises:
   a control unit operable to: (a) cause the sound to be outputted from the internal speaker, when the information indicating the first sound output mode is held in the holding unit, and (b) not cause the sound to be outputted from the internal speaker when the information indicating the second sound output mode is held in the holding unit.

2. The video and sound output device according to claim 1, wherein the output unit is operable to output information indicating a changed sound output mode to the external speaker control device when the information indicating the sound output mode held in the holding unit is changed.

3. The video and sound output device according to claim 1, wherein, when the information indicating the first sound output mode is held in the holding unit, the control unit is operable to control a volume of the sound outputted from the internal speaker based on a sound volume change instruction for changing the volume of the output sound when the receiving unit receives the sound volume change instruction from the outside of the video and sound output device; and
when the information indicating the second sound output mode is held in the holding unit, the output unit is operable to output sound volume control information for controlling a volume of the sound outputted from the external speaker based on the sound volume change instruction when the receiving unit receives the sound volume change instruction from the outside of the video and sound output device.

4. The video and sound output device according to claim 1, wherein the output unit is operable to: (a) output power supply control information for turning OFF the external speaker control device to the external speaker control device when the information indicating the first sound output mode is held in the holding unit, and (b) output a power supply control information for turning ON the external speaker control device to the external speaker control device when the information indicating the second sound output mode is held in the holding unit.

5. The video and sound output device according to claim 1, wherein the receiving unit is operable to receive the mode specifying instruction from a remote controller which controls the external speaker control device.

6. A video and sound output device which outputs video and sound, the video and sound output device comprising:
   a holding unit operable to hold information indicating a sound output mode;
   a receiving unit operable to receive a mode specifying instruction for specifying a sound output mode;
   a management unit operable to cause, based on the mode specifying instruction, the holding unit to hold one of:
   (a) information indicating a first sound output mode in which sound is outputted from a first external speaker that is a first speaker outside the video and sound output device, and
   (b) information indicating a second sound output mode in which sound is outputted from a second external speaker that is a second speaker outside the video and sound output device; and
   an output unit operable to output the information indicating the sound output mode held in the holding unit, to another video and sound output device having the first external speaker and to an external speaker control device which controls the second external speaker, wherein the output unit is operable to output information to the external speaker control device such that: (a) when the information indicating the first sound output mode is received, the sound is not outputted from the external speaker; and (b) when the information indicating the second sound output mode is received, the sound is outputted from the external speaker, and the video and sound output device further comprises:

a control unit operable to: (a) cause the sound to be outputted from the internal speaker, when the information indicating the first sound output mode is held in the holding unit, and (b) not cause the sound to be outputted from the internal speaker when the information indicating the second sound output mode is held in the holding unit.

7. The video and sound output device according to claim 6, wherein the output unit is operable to output information indicating a changed sound output mode to the another video and sound output device and the external speaker control device when the information indicating the sound output mode held in the holding unit is changed.

8. A video and sound output system, comprising:

a video and sound output device which outputs video and sound; and an external speaker control device which controls an external speaker outside the video and sound output device, wherein the video and sound output device comprises:

an internal speaker operable to output sound;

a holding unit operable to hold information which indicates a sound output mode;

a receiving unit operable to receive a mode specifying instruction for specifying a sound output mode:

a management unit operable to cause, based on the mode specifying received by the receiving unit, the holding unit to hold one of:

(a) information indicating a first sound output mode in which sound is outputted from the internal speaker; and (b) information indicating a second sound output mode in which sound is outputted from an external speaker outside the video and sound output device; and an output unit operable to output the information indicating the sound output mode held in the holding unit, to an external speaker control device which controls the external speaker, wherein the video and sound output device further comprises:

a control unit operable to: (a) cause the sound to be outputted from the internal speaker, when the information indicating the first sound output mode is held in the holding unit, and (b) not cause the sound to be outputted from the internal speaker when the information indicating the second sound output mode is held in the holding unit, and the external speaker control device includes:

a receiving unit operable to receive the information indicating the sound output mode from the video and sound output device; and a sound control unit operable to: (a) not cause sound to be outputted from the external speaker when the receiving unit receives the information indicating the first sound output mode, and (b) cause the sound to be outputted from the external speaker when the receiving unit receives the information indicating the second sound output mode.

* * * * *